United States Patent
Babaei

(10) Patent No.: US 12,089,118 B2
(45) Date of Patent: Sep. 10, 2024

(54) BEAM-BASED COUNTING INDICATION FOR MULTICAST BROADCAST SERVICES

(71) Applicant: Toyota Jidosha Kabushiki Kaisha, Aichi-ken (JP)

(72) Inventor: Alireza Babaei, Fairfax, VA (US)

(73) Assignee: Toyota Jidosha Kabushiki Kaisha, Toyota (JP)

(*) Notice: Subject to any disclaimer, the term of this patent is extended or adjusted under 35 U.S.C. 154(b) by 222 days.

(21) Appl. No.: 17/644,055

(22) Filed: Dec. 13, 2021

(65) Prior Publication Data

US 2024/0064491 A1 Feb. 22, 2024

Related U.S. Application Data

(60) Provisional application No. 63/124,908, filed on Dec. 14, 2020.

(51) Int. Cl.
| | |
|---|---|
| *H04W 4/06* | (2009.01) |
| *H04W 4/12* | (2009.01) |
| *H04W 56/00* | (2009.01) |
| *H04W 74/0833* | (2024.01) |
| *H04W 76/20* | (2018.01) |

(52) U.S. Cl.
CPC ............... *H04W 4/06* (2013.01); *H04W 4/12* (2013.01); *H04W 56/001* (2013.01); *H04W 74/0841* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 11,019,601 | B2* | 5/2021 | Lee | H04W 76/40 |
| 11,272,324 | B2* | 3/2022 | Kim | H04W 72/046 |
| 2018/0234807 | A1* | 8/2018 | Park | H04W 72/51 |
| 2019/0116467 | A1* | 4/2019 | Belleschi | H04W 76/27 |
| 2019/0261431 | A1* | 8/2019 | Tsai | H04W 72/23 |
| 2019/0268879 | A1* | 8/2019 | Lee | H04B 7/0695 |
| 2020/0264261 | A1* | 8/2020 | Akkarakaran | H04W 72/23 |
| 2020/0351801 | A1* | 11/2020 | Jeon | H04W 52/48 |
| 2020/0351955 | A1* | 11/2020 | Jeon | H04L 5/0092 |
| 2021/0045017 | A1* | 2/2021 | Takeda | H04L 12/189 |
| 2021/0136532 | A1* | 5/2021 | Liu | H04W 72/23 |
| 2021/0144516 | A1* | 5/2021 | Kim | H04W 72/1273 |

(Continued)

OTHER PUBLICATIONS

ETSI TS 138 331, "5G: NR; Radio Resource Control (RRC); Protocol specification", 3GPP TS 38.331 version 16.1.0 Release 16, (Jul. 2020), 886 pages, (part 1, pp. 1-296), downloadable from http://www.etsi.org/standards-search.

(Continued)

*Primary Examiner* — Eunsook Choi
(74) *Attorney, Agent, or Firm* — Finnegan, Henderson, Farabow, Garrett & Dunner, LLP

(57) ABSTRACT

A system, method and apparatus for wireless communications is provided. A user equipment (UE) transmits to a base station, a first message comprising a first field and a second field. The first field corresponds to information associated with receiving data of at least one MBS service. The second field associated with receiving data of the at least one MBS service via at least one first beam. The UE then receives data of the at least one MBS service via the at least one first beam.

44 Claims, 23 Drawing Sheets

(56) References Cited

U.S. PATENT DOCUMENTS

| | | | | |
|---|---|---|---|---|
| 2021/0243567 A1* | 8/2021 | Takano | ............... | H04W 24/10 |
| 2022/0110184 A1* | 4/2022 | Jeon | ..................... | H04L 1/0023 |
| 2022/0322288 A1* | 10/2022 | Xu | ....................... | H04W 76/40 |
| 2022/0338291 A1* | 10/2022 | Hong | ..................... | H04W 4/06 |
| 2022/0408410 A1* | 12/2022 | Ratasuk | ............. | H04W 72/046 |

OTHER PUBLICATIONS

ETSI TS 138 331, "5G: NR; Radio Resource Control (RRC); Protocol specification", 3GPP TS 38.331 version 16.1.0 Release 16, (Jul. 2020), 886 pages, (part 2, pp. 297-591), downloadable from http://www.etsi.org/standards-search.

ETSI TS 138 331, "5G: NR; Radio Resource Control (RRC); Protocol specification", 3GPP TS 38.331 version 16.1.0 Release 16, (Jul. 2020), 886 pages, (part 3, pp. 592-886), downloadable from http://www.etsi.org/standards-search.

\* cited by examiner

| Transport channel \ Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel \ Logical channel | RACH | UL-SCH |
|---|---|---|
| CCCH | | X |
| DCCH | | X |
| DTCH | | X |

FIG. 3B

| Transport channel \ Logical channel | SL-BCH | SL-SCH |
|---|---|---|
| SBCCH | X | |
| SCCH | | X |
| STCH | | X |

FIG. 3C

| Physical channel | PDSCH | PDCCH | PBCH |
|---|---|---|---|
| Transport channel | | | |
| BCH | | | X |
| PCH | X | | |
| DL-SCH | X | | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

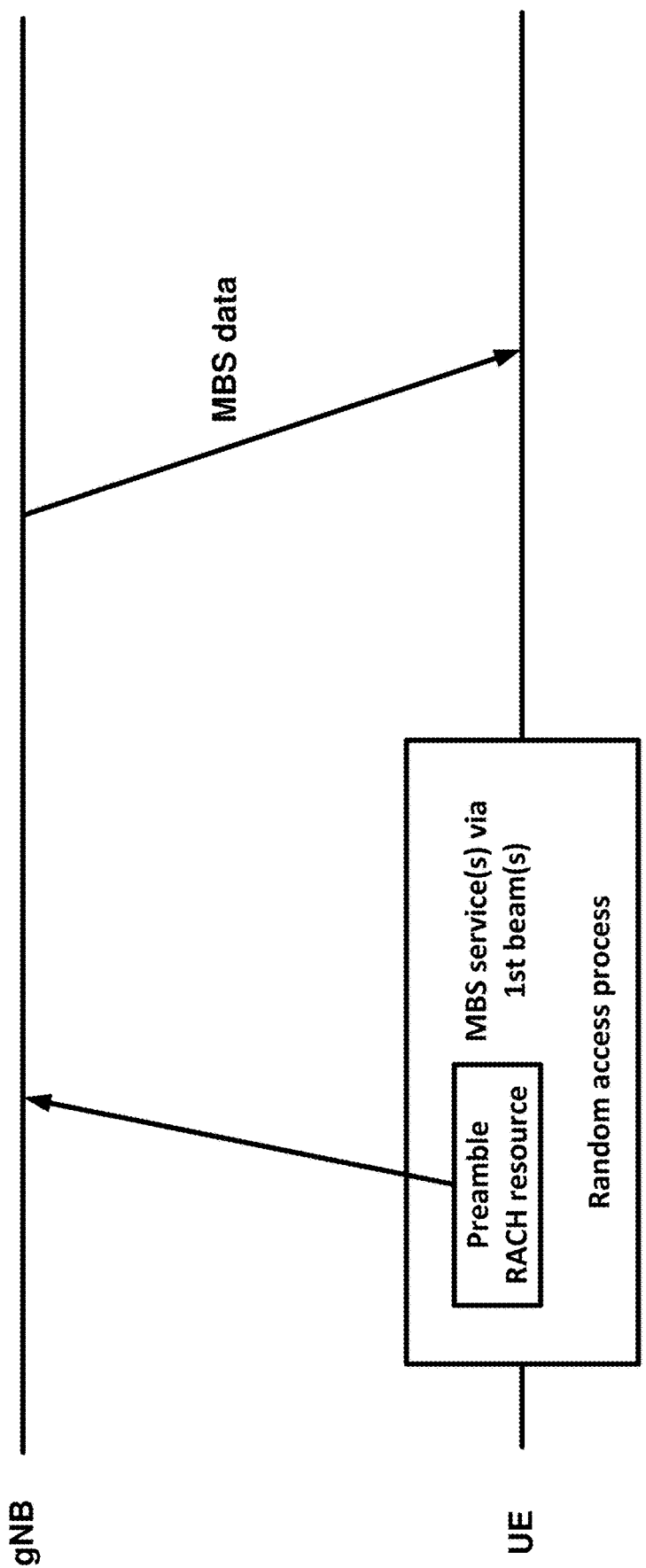

BEAM-BASED COUNTING INDICATION FOR MULTICAST BROADCAST SERVICES

CROSS-REFERENCE TO RELATED APPLICATION

This application claims the benefit of U.S. Provisional Application No. 63/124,908, entitled "BEAM-BASED COUNTING INDICATION FOR MULTICAST BROADCAST SERVICES", and filed on Dec. 14, 2020. U.S. Provisional Application No. 63/124,908 is incorporated by reference herein.

BACKGROUND

Generally described, computing devices and communication networks can be utilized to exchange information. In a common application, a computing device can request/transmit data with another computing device via the communication network. More specifically, computing devices may utilize a wireless communication network to exchange information or establish communication channels.

Wireless communication networks can include a wide variety of devices that include or access components to access a wireless communication network. Such devices can utilize the wireless communication network to facilitate interactions with other devices that can access the wireless communication network or to facilitate interaction, through the wireless communication network, with devices utilizing other communication networks.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

FIG. 23 shows an example process according to some aspects of some of various exemplary embodiments of the present disclosure.

DETAILED DESCRIPTION

Figure 1:
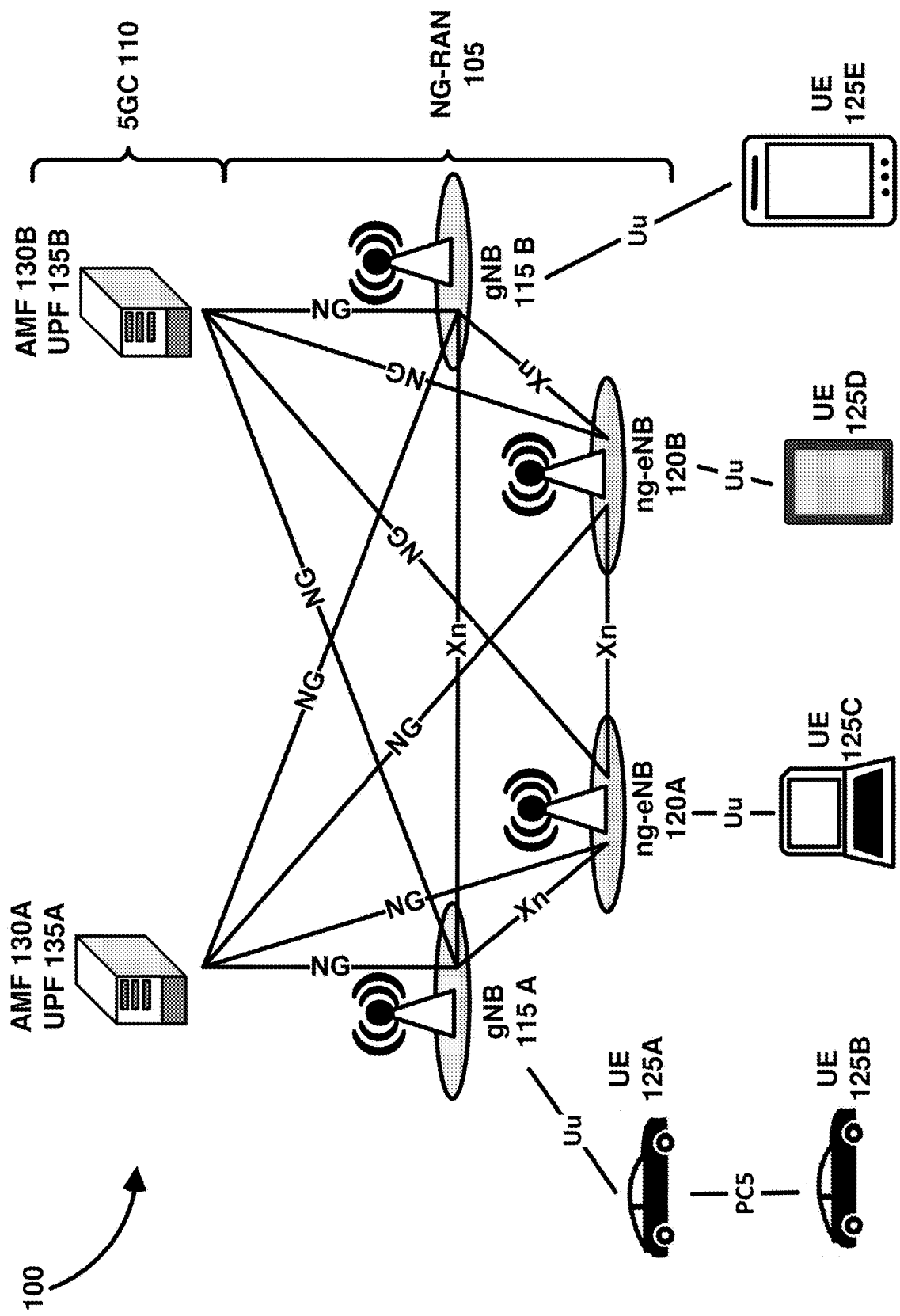
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (HOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception components for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
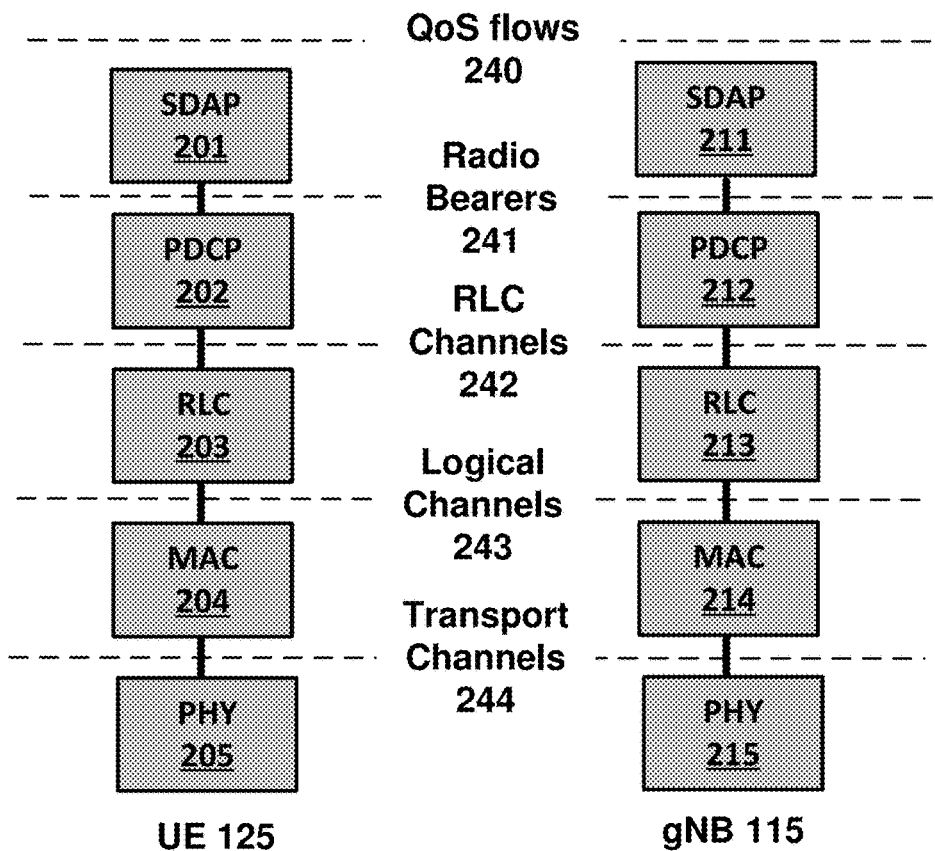
FIG. 2A and FIG. 2B show examples of radio protocol stacks for user plane and control plane, respectively, according to some aspects of some of various exemplary embodiments of the present disclosure.
Figure 2B:
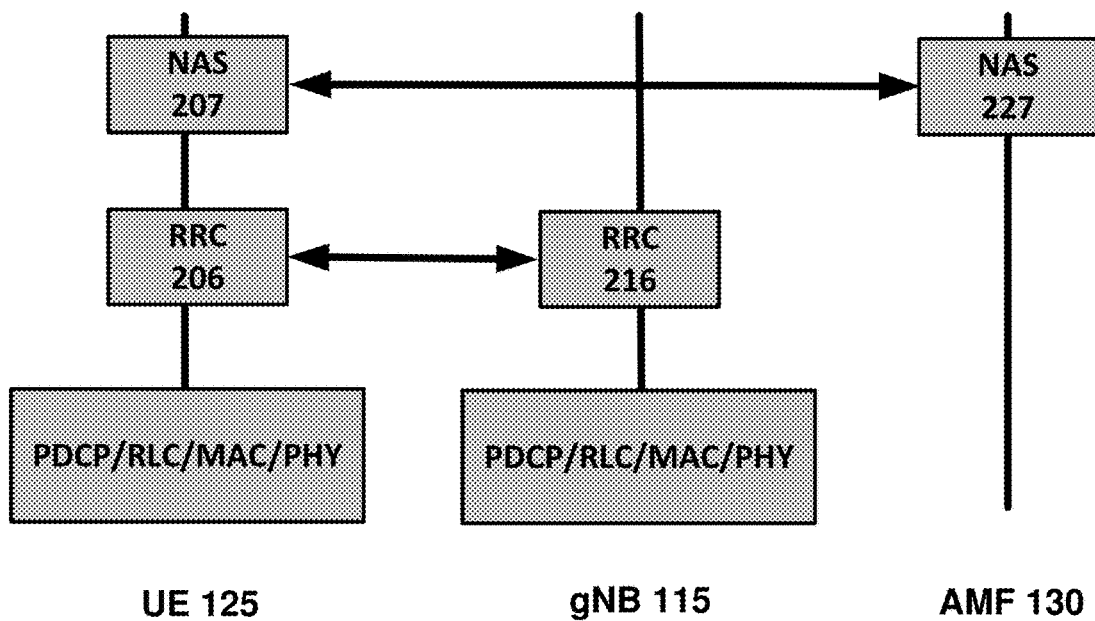

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment. The main services and functions of the PDCP 202 or PDCP 212 sublayer may include:

Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
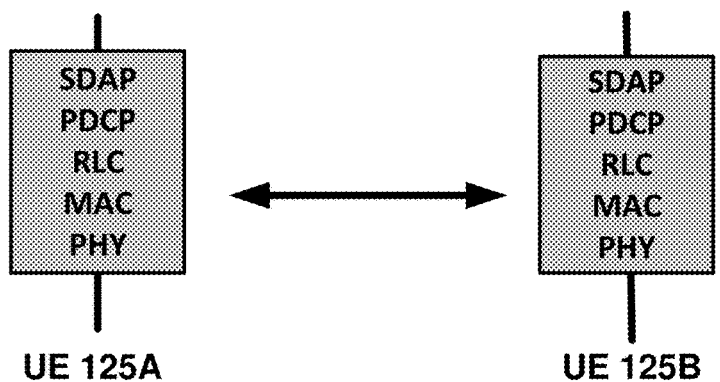
FIG. 5A, FIG. 5B, FIG. 5C and FIG. 5D show examples of radio protocol stacks for NR sidelink communication according to some aspects of some of various exemplary embodiments of the present disclosure.
Figure 5B:
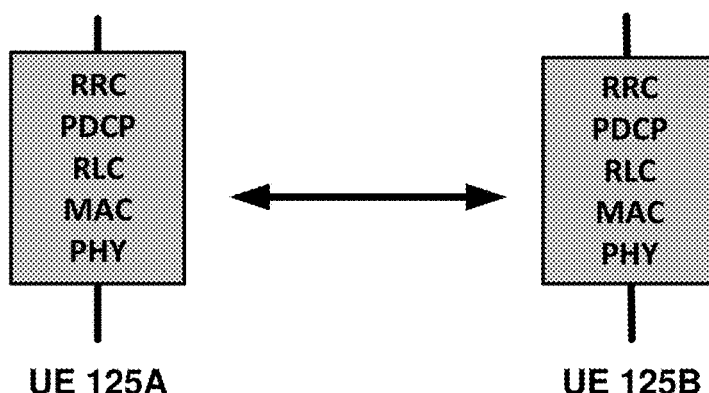
Figure 5C:
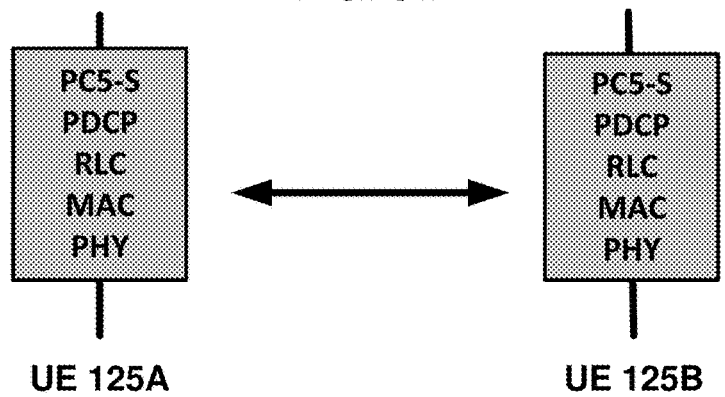
Figure 5D:
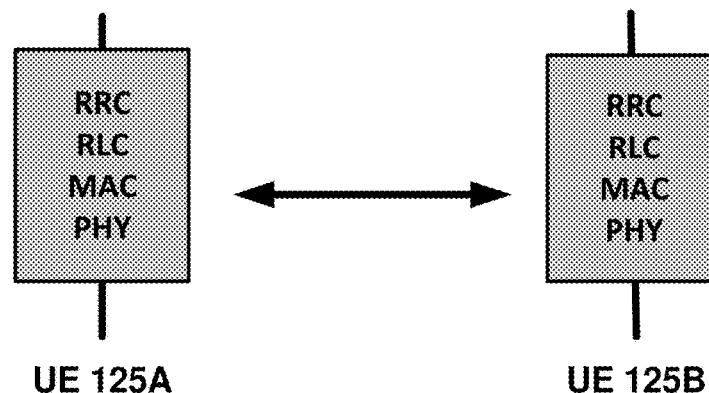

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
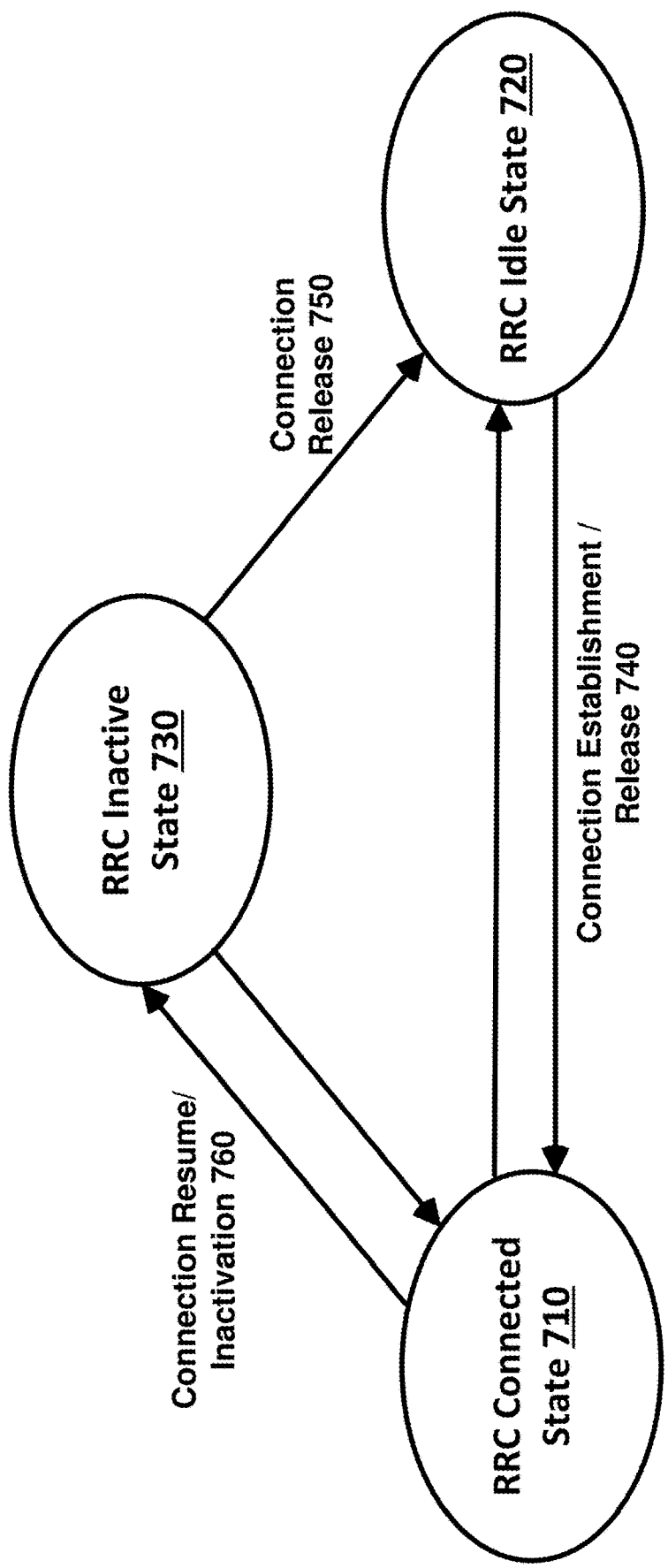
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
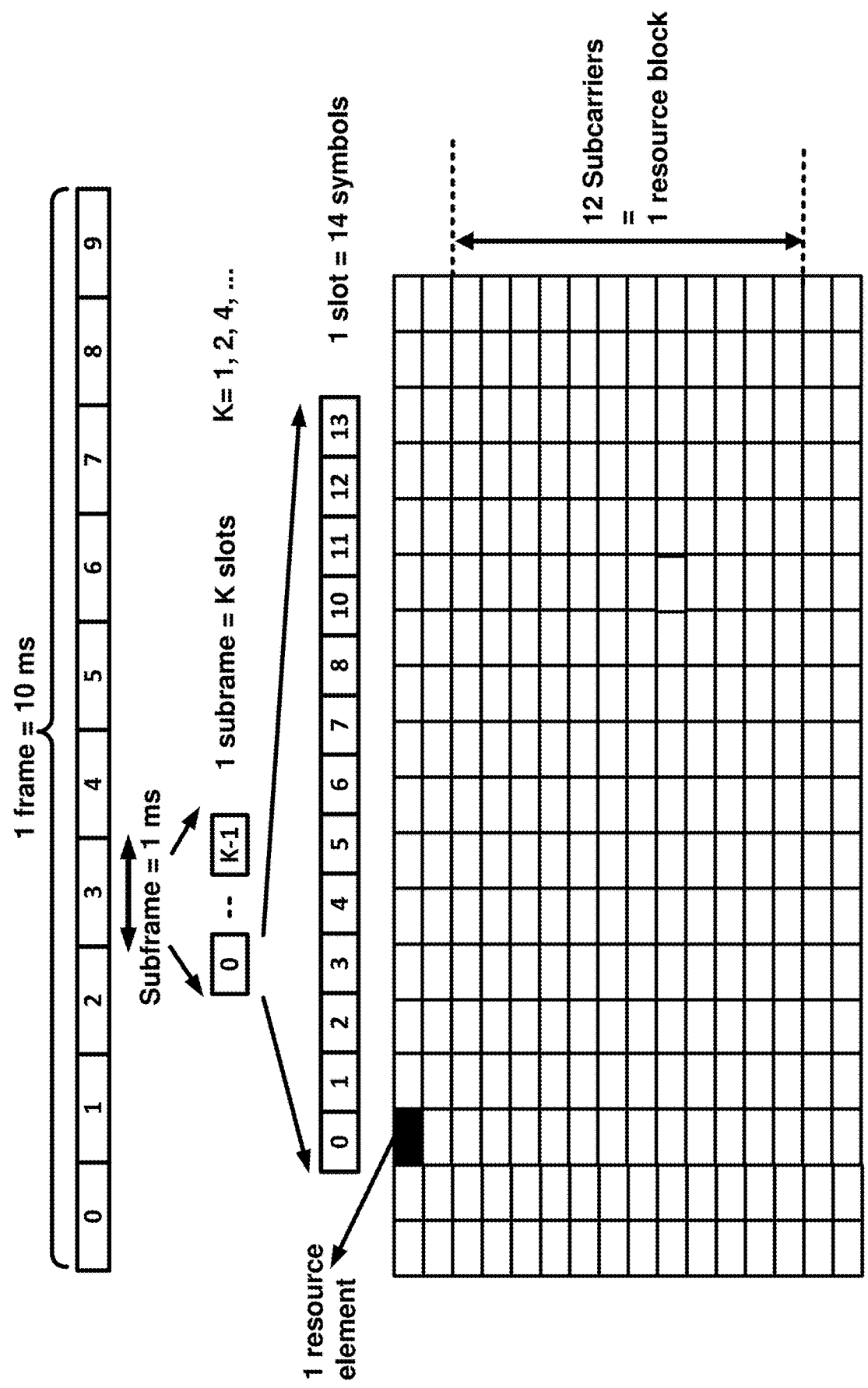
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
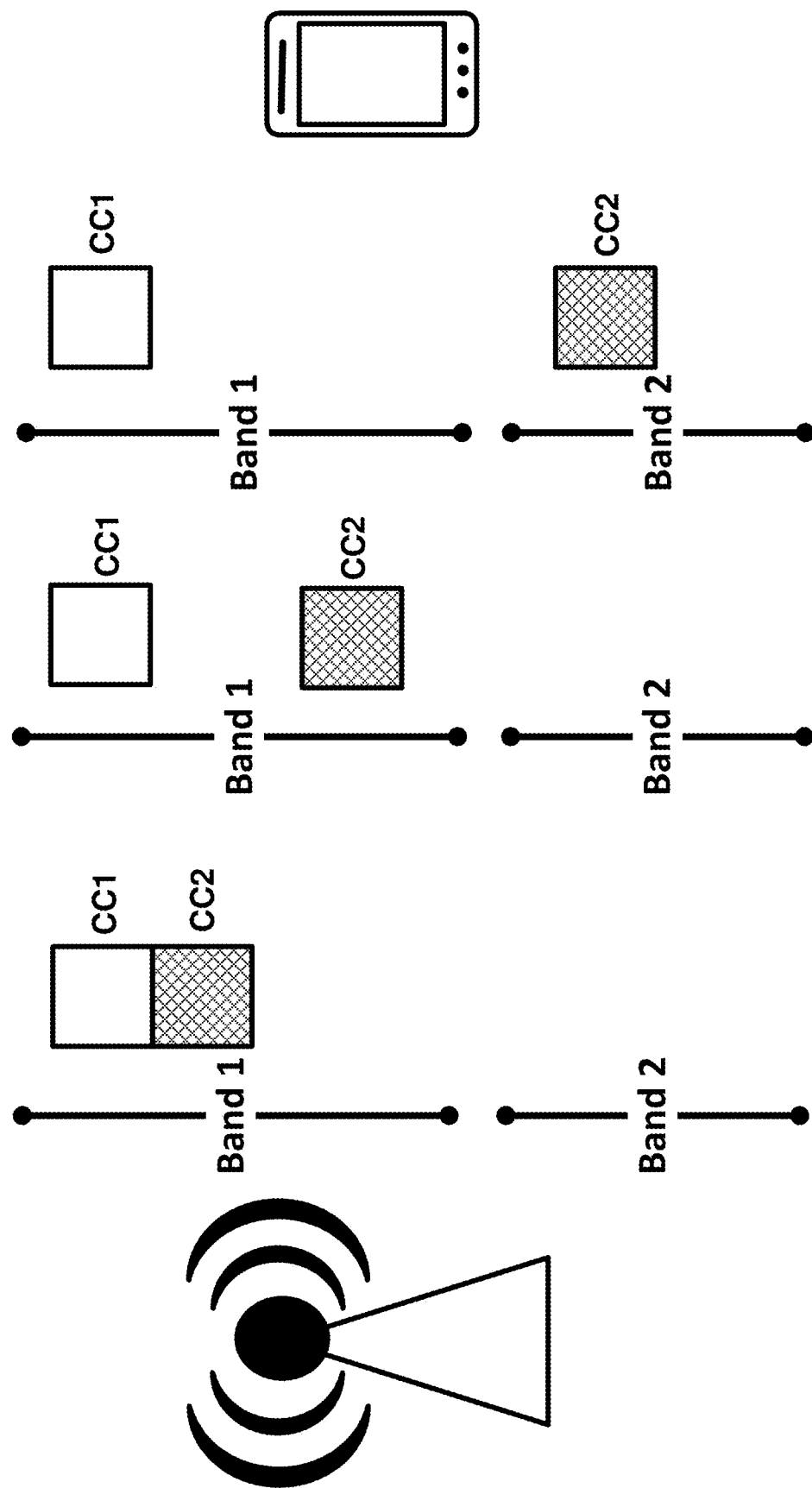
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
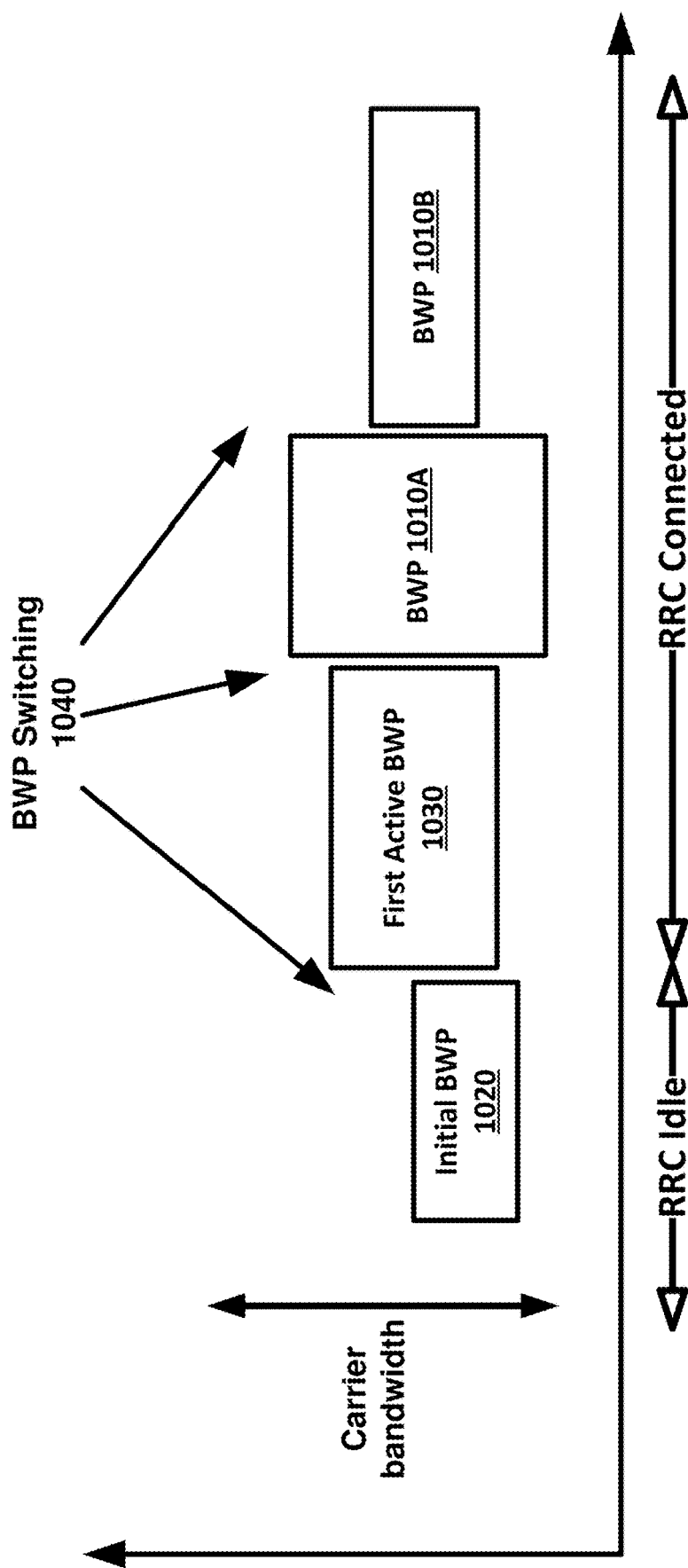
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
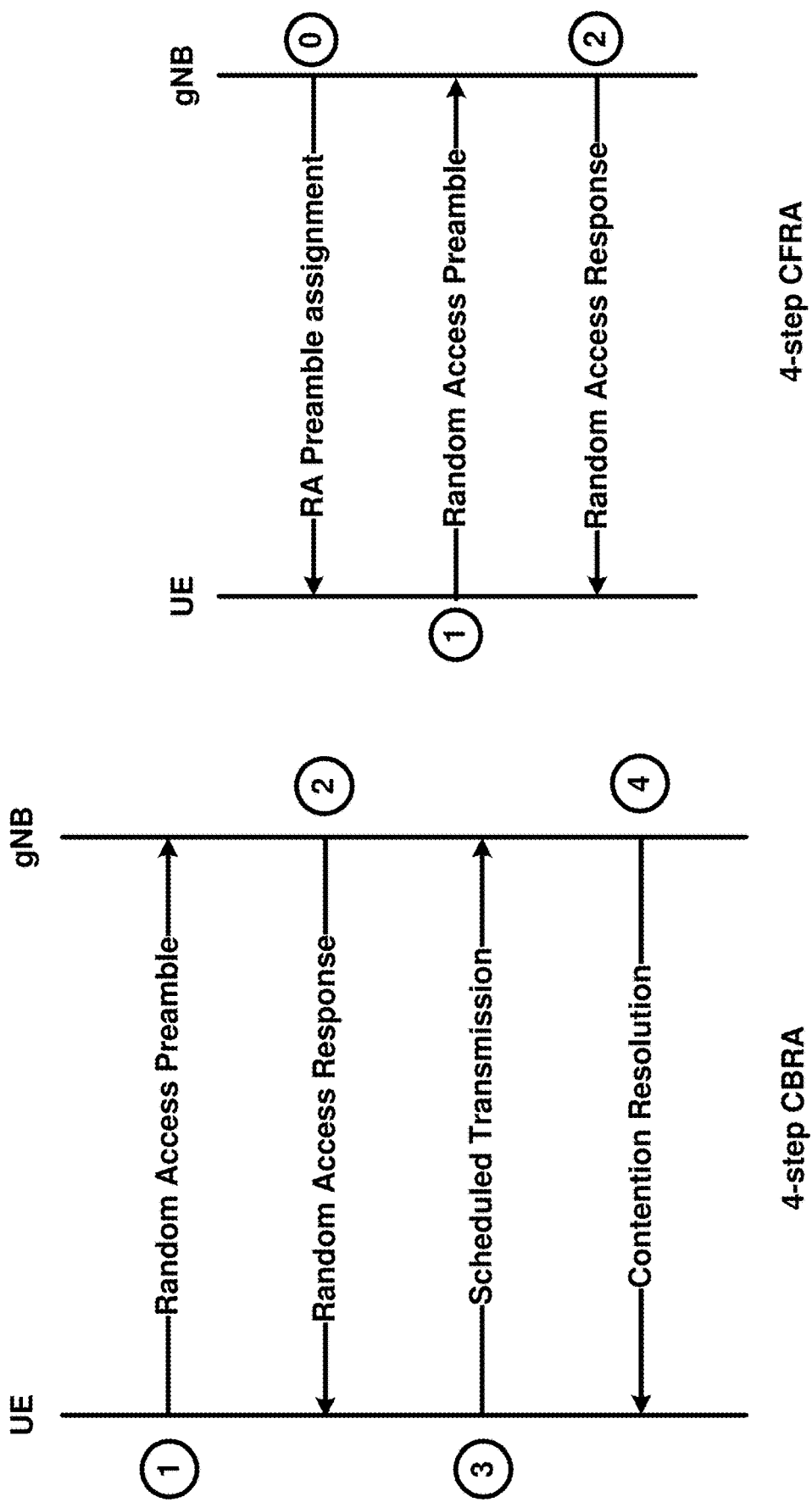
FIG. 11 shows example four-step contention-based and contention-free random access processes according to some aspects of some of various exemplary embodiments of the present disclosure.
Figure 12:
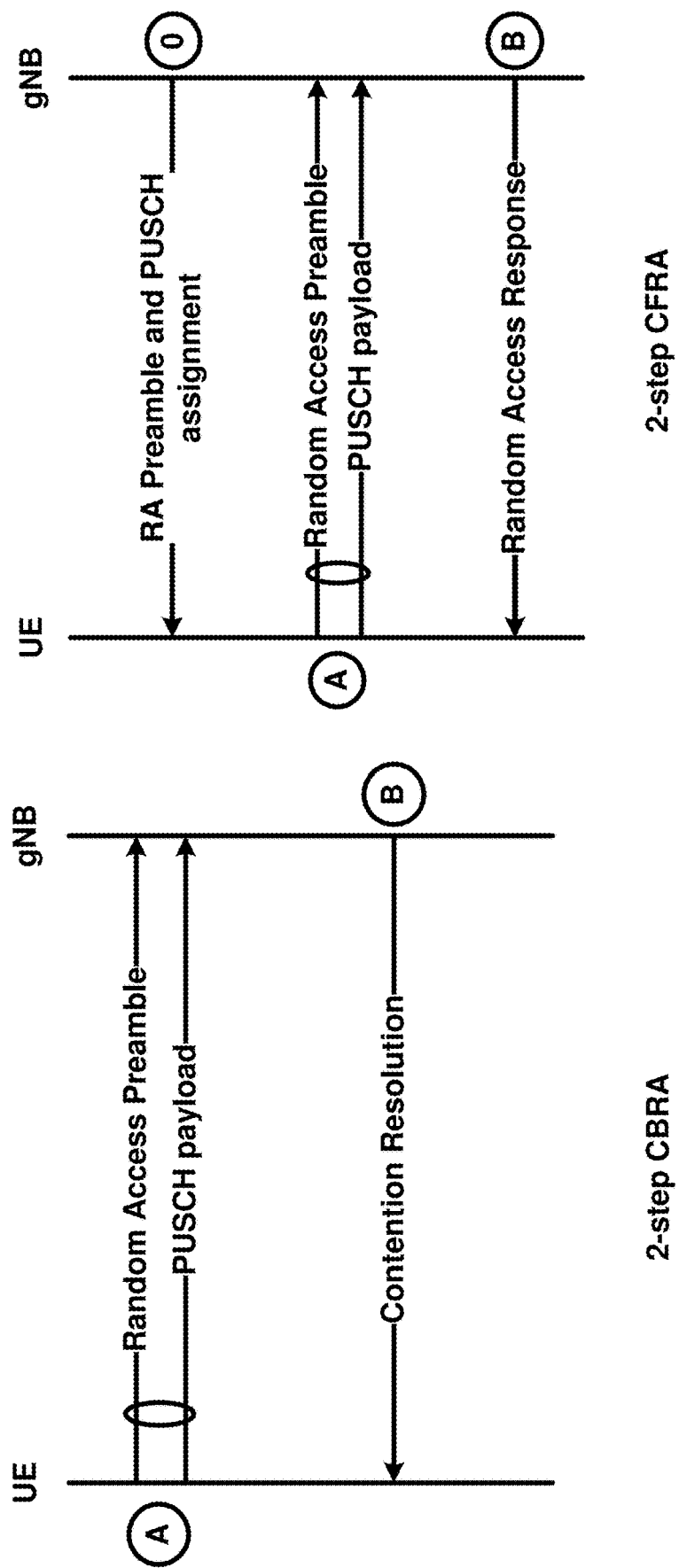
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re)transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
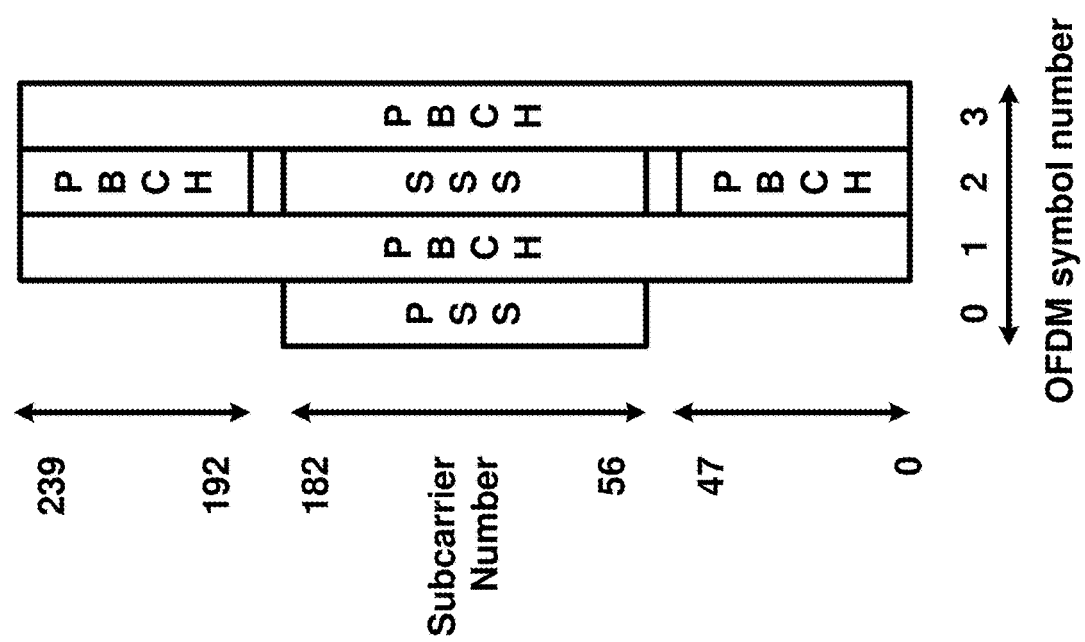
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e. using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
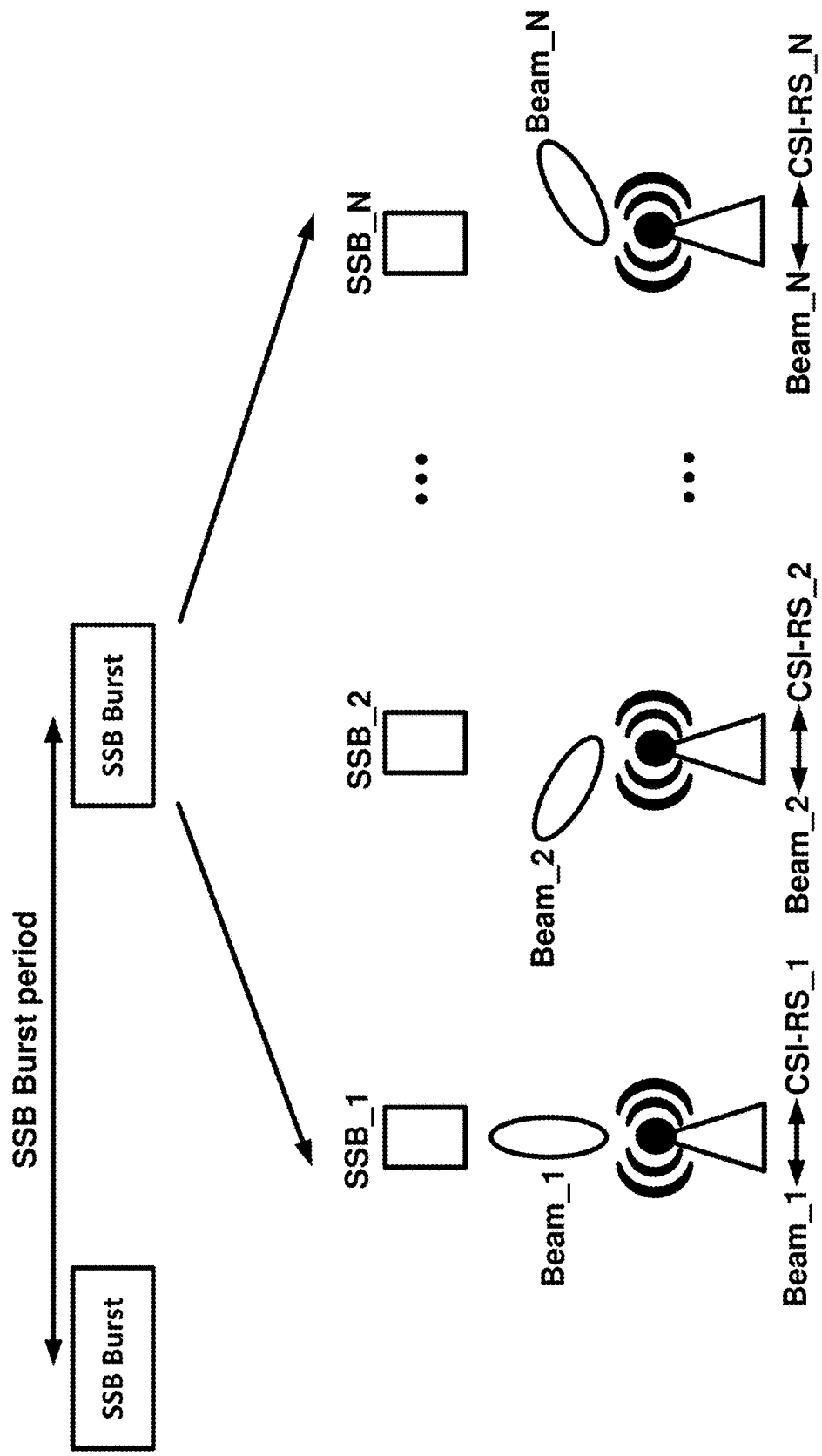
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}, 'QCL-TypeC': {Doppler shift, average delay}, 'QCL-TypeD': {Spatial Rx parameter}. The UE may receive an activation command (e.g., a MAC CE), used to map TCI states to the codepoints of a DCI field.

Figure 15:
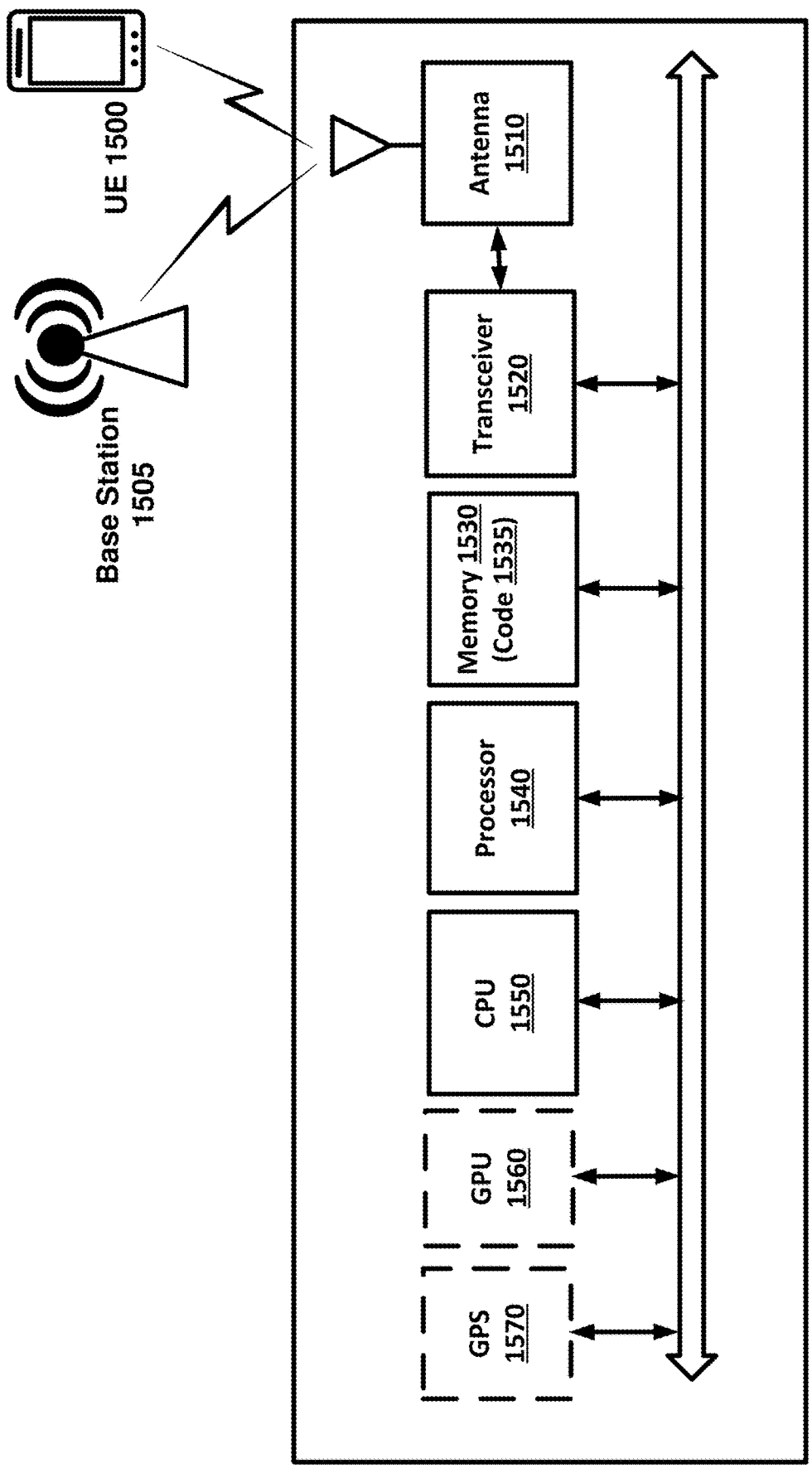
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. Still further, UEs 125 may also include components or subcomponents integrated into other devices, such as vehicles, to provide wireless communication functionality with nodes in the RAN, other UEs, satellite communications as described herein. Such other devices may have other functionality or multiple functionalities in addition to wireless communications. Accordingly, reference to UE may include the individual components facilitating the wireless communication as well as the entire device that incorporates components for facilitating wireless communications.

Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some example, MBS services may be enabled via single-cell transmission. MBS may be transmitted in the coverage of a single cell. One or more Multicast/Broadcast control channels (e.g., MCCHs) and one or more Multicast/Broadcast data channels (e.g., MTCHs) may be mapped on DL-SCH. The scheduling may be done by the gNB. The Multicast/Broadcast control channel and the Multicast/Broadcast data channel transmissions may be indicated by a logical channel specific RNTI on PDCCH. In some examples, a one-to-one mapping between a service identifier such as a temporary mobile group identifier (TMGI) and a RAN level identifier such as a group identifier (G-RNTI) may be used for the reception of the DL-SCH to which a Multicast/Broadcast data channel may be mapped. In some examples, a single transmission may be used for DL-SCH associated with the Multicast/Broadcast control channel and/or the Multicast/Broadcast data channel transmissions and HARQ or RLC retransmissions may not be used and/or an RLC Unacknowledged Mode (RLC UM) may be used. In other examples some feedback (e.g., HARQ feedback or RLC feedback) may be used for transmissions via Multicast/Broadcast control channel and/or Multicast/Broadcast data channels.

In some example, for Multicast/Broadcast data channel, the following scheduling information may be provided on Multicast/Broadcast control channel: a Multicast/Broadcast data channel scheduling cycle, a Multicast/Broadcast data channel on-duration (e.g., duration that the UE waits for, after waking up from DRX, to receive PDCCHs), a Multicast/Broadcast data channel inactivity timer (e.g., duration that the UE waits to successfully decode a PDCCH, from the last successful decoding of a PDCCH indicating the DL-SCH to which this Multicast/Broadcast data channel is mapped, failing which it re-enters DRX).

In some examples, one or more UE identities may be related to MBS transmissions. The one or more identities may comprise at least one of: one or more first RNTIs that identify transmissions of the Multicast/Broadcast control channel; one or more second RNTIs that identify transmissions of a Multicast/Broadcast data channels. The one or more first RNTIs that identify transmissions of the Multicast/Broadcast control channel may comprise a single cell RNTI (SC-RNTI, other names may be used). The one or more second RNTIs that identify transmissions of a Multicast/Broadcast data channels may comprise a G-RNTI (nG-RNTI or other names may be used).

In some examples, one or more logical channels may be related to MBS transmissions. The one or more logical channels may comprise a Multicast/Broadcast control channel. The Multicast/Broadcast control channel may be a point-to-multipoint downlink channel used for transmitting MBS control information from the network to the UE, for one or several Multicast/Broadcast data channel. This channel may be used by UEs that receive or are configured for receiving MBS. The one or more logical channels may comprise a Multicast/Broadcast data channel. This channel may be a point-to-multipoint downlink channel for transmitting MBS traffic data from the network.

Figure 16:
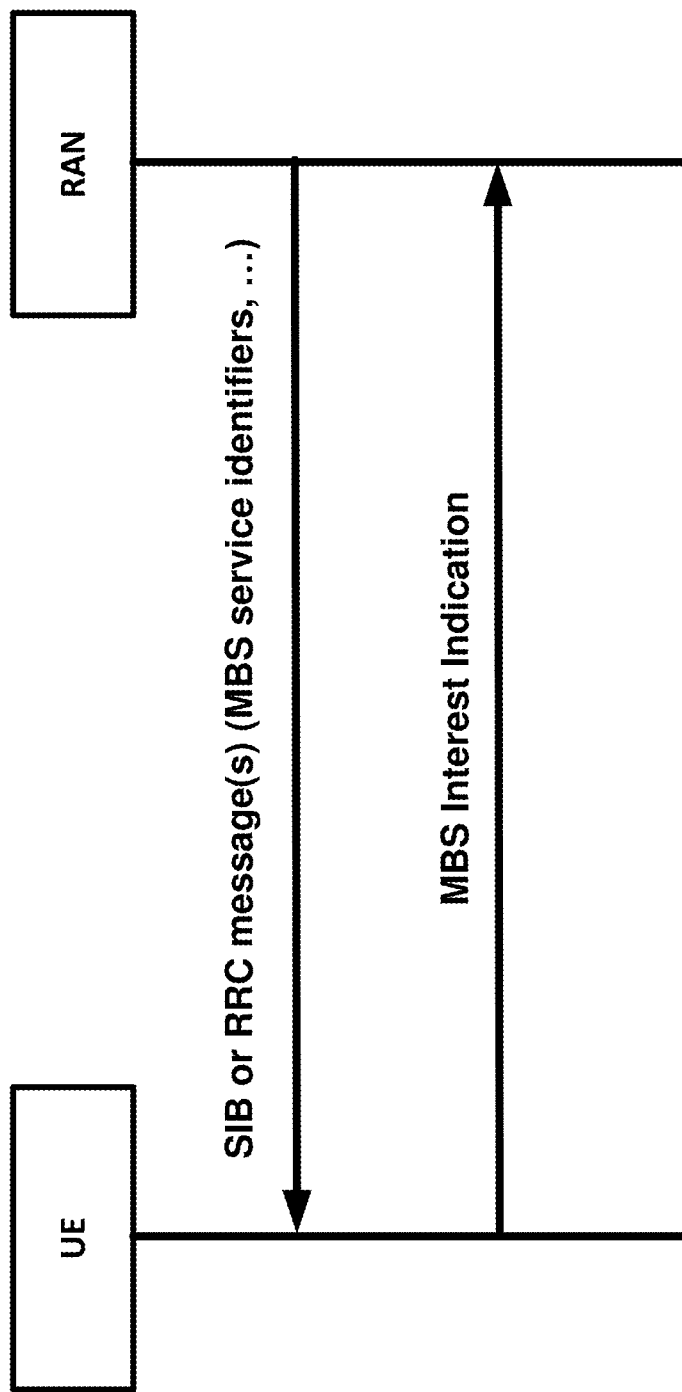
FIG. 16 shows an example process according to some aspects of some of various exemplary embodiments of the present disclosure.

In some examples, a procedure may be used by the UE to inform RAN that the UE is configured for receiving or has been instructed to receive MBS service(s) via an MBS radio bearer, and if so, to inform the 5G RAN about the priority of MBS versus unicast reception or MBS service(s) reception in receive only mode. An example is shown in FIG. 16. The UE may transmit a message (e.g., an MBS interest indication message) message to inform RAN that the UE is receiving/available to receive or no longer receiving/available to receive MBS service(s). The UE may transmit the message based on receiving one or more messages (e.g., a SIB message or a unicast RRC message) from the network for example indicating one or more MBS Service Area Identifiers of the current and/or neighboring carrier frequencies. Illustratively, the configuration of the UE to receive or availability to receive MBS services may be characterized as an "interest" in receiving MBS services. Additionally, receipt of data associated with MBS services can include the receipt of data from the MBS services or receipt of information utilized to identify availability, configuration, etc. for receipt of MBS services.

In some examples, the UE may consider an MBS service to be part of the MBS services of availability if the UE is capable of receiving MBS services (e.g., via a single cell point to multipoint mechanism). In other example, the UE is receiving or configured to receive this service via a bearer associated with MBS services. In still other examples, the one session of this service is ongoing or about to start. In another example at least one of the one or more MBS service identifiers indicated by network is of are identified to the UE or otherwise configured to identify.

In some examples, control information for reception of MBS services may be provided on a specific logical channel: (e.g., a MCCH). The MCCH may carry one or more configuration messages which indicate the MBS sessions that are ongoing as well as the (corresponding) information on when each session may be scheduled, e.g., scheduling period, scheduling window and start offset. The one or more configuration messages may provide information about the neighbor cells transmitting the MBS sessions which may be ongoing on the current cell. In some examples, the UE may receive a single MBS service at a time, or more than one MBS services in parallel.

In some example, the MCCH information (e.g., the information transmitted in messages sent over the MCCH) may be transmitted periodically, using a configurable repetition period. The MCCH transmissions (and the associated radio resources and MCS) may be indicated on PDCCH.

In some examples, change of MCCH information may occur at specific radio frames/subframes/slots and/or a modification period may be used. For example, within a modification period, the same MCCH information may be transmitted a number of times, as defined by its scheduling (which is based on a repetition period). The modification period boundaries may be defined by SFN values for which SFN mod m=0, where m is the number of radio frames comprising the modification period. The modification period may be configured by a SIB or by RRC signaling.

In some examples, when the network changes (some of) the MCCH information, it may notify the UEs about the change in the first subframe/slot which may be used for MCCH transmission in a repetition period. Upon receiving a change notification, a UE interested to receive MBS services may acquire the new MCCH information starting from the same subframe/slot. The UE may apply the previously acquired MCCH information until the UE acquires the new MCCH information.

In an example, a system information block (SIB) may contain the information required to acquire the control information associated transmission of MBS. The information may comprise at least one of: one or more discontinuous reception (DRX) parameters for monitoring for scheduling information of the control information associated transmission of MBS, scheduling periodicity and offset for scheduling information of the control information associated transmission of MBS, modification period for modification of content of the control information associated transmission of MBS, repetition information for repetition of the control information associated transmission of MBS, etc.

In an example, an information element (IE) may provide configuration parameters indicating, for example, the list of ongoing MBS sessions transmitted via one or more bearers for each MBS session, one or more associated RNTIs (e.g., G-RNTI, other names may be used) and scheduling information. The configuration parameters may comprise at least one of: one or more timer values for discontinuous reception (DRX) (e.g., an inactivity timer or an On Duration timer), an RNTI for scrambling the scheduling and transmission of a Multicast/Broadcast traffic channel (e.g., MTCH, other names may be used), ongoing MBS session, one or more power control parameters, one or more scheduling periodicity and/or offset values for one or more MB S traffic channels, information about list of neighbor cells, etc.

In some examples a gNB or ng-eNB may comprise logical nodes that host some, all or parts of the user plane and/or control plane functionalities. For example, a gNB Central Unit (gNB-CU) may be a logical node hosting RRC, SDAP and PDCP protocols of the gNB or RRC and PDCP protocols of the en-gNB that controls the operation of one or more gNB-DUs. The gNB-CU may terminate the F1 interface connected with the gNB-DU. A gNB Distributed Unit (gNB-DU) may be a logical node hosting RLC, MAC and PHY layers of the gNB or en-gNB, and its operation may be partly controlled by gNB-CU. One gNB-DU may support one or multiple cells. One cell may be supported by only one gNB-DU. The gNB-DU may terminate the F1 interface connected with the gNB-CU. A gNB-CU-Control Plane (gNB-CU-CP) may be a logical node hosting the RRC and the control plane part of the PDCP protocol of the gNB-CU for an en-gNB or a gNB. The gNB-CU-CP may terminate the E1 interface connected with the gNB-CU-UP and the F1-C interface connected with the gNB-DU. A gNB-CU-User Plane (gNB-CU-UP) may be a logical node hosting the user plane part of the PDCP protocol of the gNB-CU for an en-gNB, and the user plane part of the PDCP protocol and the SDAP protocol of the gNB-CU for a gNB. The gNB-CU-UP may terminate the E1 interface connected with the gNB-CU-CP and the F1-U interface connected with the gNB-DU.

In some examples, an MBS counting procedure may be used to determine if there are sufficient UEs interested in receiving a service to enable the operator to decide if it is appropriate to deliver the service. In some examples, MBS counting may apply to UEs in Connected state. In some examples, MBS counting may apply to UEs in all RRC states.

In some examples, the Counting Procedure may be initiated by the network. Initiation of the Counting Procedure may result in a request to a base station involved in the providing the MBS service(s) to send a Counting Request (e.g., included in a multicast broadcast control channel), which may contain a list of MBS service identifiers requiring UE feedback. In some examples, a which is receiving or interested in the indicated services may respond, e.g., with a RRC Counting Response message and/or other indications, for example based on a random access process.

In some examples, a multicast/broadcast control channel (e.g., MCCH) may carry an MBS counting request message, when the network determines to count the number of UEs (e.g., the number of UEs in RRC CONNECTED state or number of UEs in all states) that are receiving or interested to receive one or more specific MBS services.

In some examples, the multicast/broadcast control channel (e.g., MCCH) information change notification may be used to inform the UE about a change of the multicast/broadcast control channel information upon session start or about the start of MBS counting.

In some examples, for a UE that may be capable of receiving MBS services, the UE may start acquiring the MBS Counting Request message if present, from the beginning of the modification period following the one in which the change notification was received.

In some examples, upon receiving MBS Counting Request message, the UE may perform the MBS Counting procedure.

Figure 17:
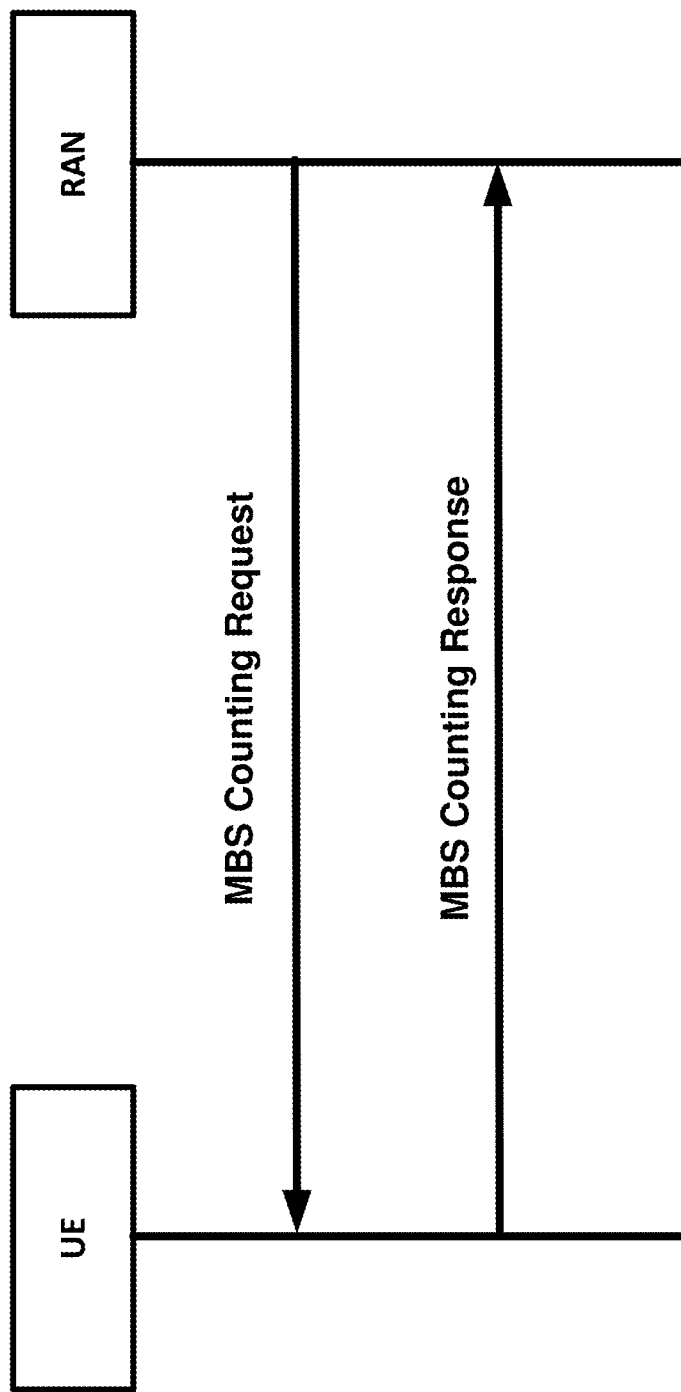
FIG. 17 shows an example process according to some aspects of some of various exemplary embodiments of the present disclosure.

In some examples, as shown in FIG. 17, the MBMS Counting procedure may be used by the RAN to count number of UEs (e.g., the number of UEs in RRC CONNECTED state or number of UEs in all states) which are receiving via a radio bearer (e.g., an MBS radio bearer) or interested to receive via a radio bearer (e.g., an MBS radio bearer) the specified MBS services. In some examples, the UE may determine interest in an MBS service, that is identified by a service identifier, by interaction with upper layers. The RAN may initiate the procedure by sending an MBS Counting Request message. In some example, the MBS Counting Request Message may comprise a counting request list indicating one or more MBS services and/or radio bearers associated with the one or more MBS service. In some examples, when the UE is receiving or is interested in receiving one or more first MBS services of the one or more MBS services included in the counting request list, the UE may indicate (e.g., via a message (e.g., an MBS counting response message) and/or via other indications such as using a random access process) that the UE is receiving or is interested in receiving the one or more first MBS services.

In some examples, the purpose of an MBS interest indication procedure may be to inform the RAN that the UE is receiving or is interested to receive MBS service(s) via one or more radio bearers (e.g., one or more MBS radio bearers), and/or to inform the RAN about the priority of MBS versus unicast reception and/or MBS service(s) reception in receive only mode.

In some examples, the MBS Counting Request message may be used by RAN to count the UEs that are receiving or interested to receive specific MBS services. In some examples, the MBMS Counting Response message may be used by the UE to respond to an MBMS Counting Request message. In some examples, an MBS counting response message may comprise a list of MBS services which the UE is receiving or interested to receive.

In some examples, an MBS Interest Indication message may be used to inform RAN that the UE is receiving/interested to receive or no longer receiving/interested to receive MBS via an MBS radio bearer including MBS service(s) in receive only mode. In some examples, the MBS Interest Indication message may comprise one or more of a frequency bandwidth configuration, a frequency list, a parameter indicating whether UE prioritizes MB S reception over unicast reception, numerology and/or bandwidth part information for the numerology and/or bandwidth part that the UE is interested in receiving, etc.

In an example, the UE may transmit, in a capability message, a capability IE indicating a maximum number of MBS services that may be included in an MBS counting request message and/or in an MBS counting response message.

In some examples, the counting and interest reporting mechanisms may be combined into one in Uu interface and may be utilized for the NG-RAN to decide the PTP/PTM switch. In some examples, the UEs in idle/inactive mode may report interests. In some examples, the interest in MBS by UE in idle/inactive mode may be sent to an MBS capable NG-RAN node upon cell reselection, to enable target cell to trigger the establishment of multicast transport if not already existing. In some examples, the UE in idle/inactive mode may report the counting without entering RRC CONNECTED state.

In some examples, for a UE, the gNB may dynamically decide whether to deliver multicast data by PTM or PTP. The gNB may acquire some information to decide whether trigger PTP and PTM switching. When gNB decides to switch Broadcast/Multicast service delivery from PTM to PTP, resource utilization may be considered because the network may need to use multiple unicast resources to deliver the same Broadcast/Multicast service content.

In some examples, the number of unicast resources used to deliver the Broadcast/Multicast service content may be reflected in the number of interested users that receive the service in PTP case. The number of interested users may be taken into consideration by gNB before triggering Broadcast/Multicast service delivery from PTM to PTP. In some examples, a counting scheme may be used to investigate the number of interested users. With the counting scheme, network may take the number of interested user into consideration before changing the Broadcast/Multicast service delivery.

Existing procedures for MBS service interest indication or MBS counting procedure may operate inefficiently for beam-based targeted MBS service delivery. Moreover, existing procedure are not designed for UEs in RRC inactive or RRC idle states. Example embodiments enhance the MBS service interest indication or MBS counting procedures for beam-based targeted MBS service delivery or for UEs in RRC inactive or RRC idle states.

In some examples, the MBS transmission may support some form of common control, e.g., paging/notification signaling, to inform UEs in all RRC states about MBS configurations and session scheduling changes. In some examples, the MBS related signaling and data may support beamforming and beam sweeping. In some examples, for RRC IDLE/RRC INACTIVE UEs, beam sweeping may be supported for group common PDCCH/PDSCH. Example embodiments enable beam-based MBS counting to help targeted MBS transmission and Point to Point or Point to Multipoint (PTP/PTM) mode selection.

In some examples, the MBS notification signalling and MBS data may be transmitted in cells where target MBS member UEs are present and with appropriate PTP/PTM modes. This may apply to both multicast and broadcast services where some counting functionality may be used.

In some examples, there may be separated counting procedure and MBMS interest indication. The MBMS Service Counting procedure may be used to trigger the base station to count the number of UEs (e.g., UEs in the RRC connected state or UEs in all RRC states) that either are receiving the MBS service(s) or are interested, available or configured in the reception of the MBS service(s). In some examples, an MBS indication/availability procedure may be used for service continuity with mobility in connected mode.

Figure 18B:
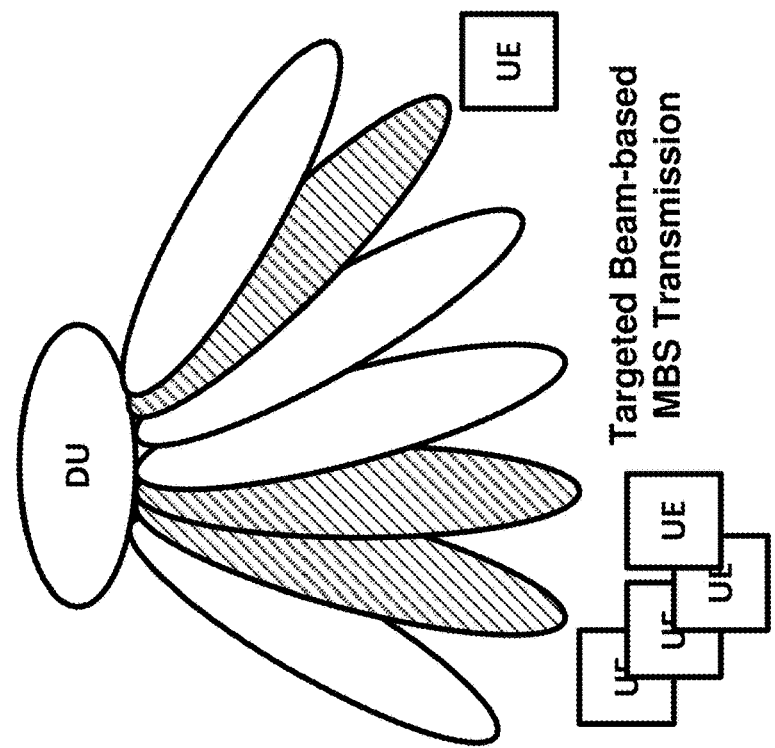
FIG. 18A and FIG. 18B show an example process according to some aspects of some of various exemplary embodiments of the present disclosure.
Figure 18A:
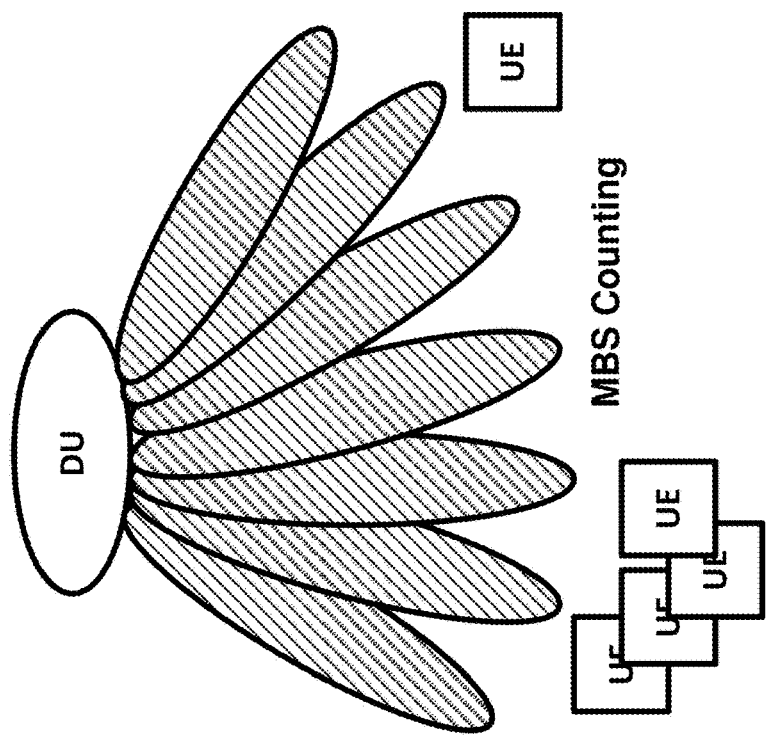

In some examples, the MBS transmission in PTP/PTM mode may be controlled by the RAN. The counting and interest reporting mechanisms may be configured by the NG-RAN to decide on the MBS transmission and PTP/PTM switch. The signalling may be designed to support targeted beam-based MBS transmission only in those cell and beams which cover MBS users as shown in FIG. 18A and FIG. 18B.

In some examples, given PTP/PTM configuration is controlled by the RAN, the MBS counting and Interest Indication may be combined. In some examples, the MBS counting and Interest Indication may be designed to enable targeted beam based MBS delivery.

In some examples, the counting and information related to receiving the MBS may be enabled for UEs in RRC idle and inactive states. In some examples, UEs in RRC idle or RRC inactive state may not transition to RRC connected state to for the interest indication and counting. The MBS Counting and Interest Indication may be enabled for UEs in all RRC states. The MBS Counting and Interest Indication signaling from UE's in RRC Inactive and Idle states may be designed such that they can be transmitted without requiring UE to transition to RRC connected state.

Figure 19:
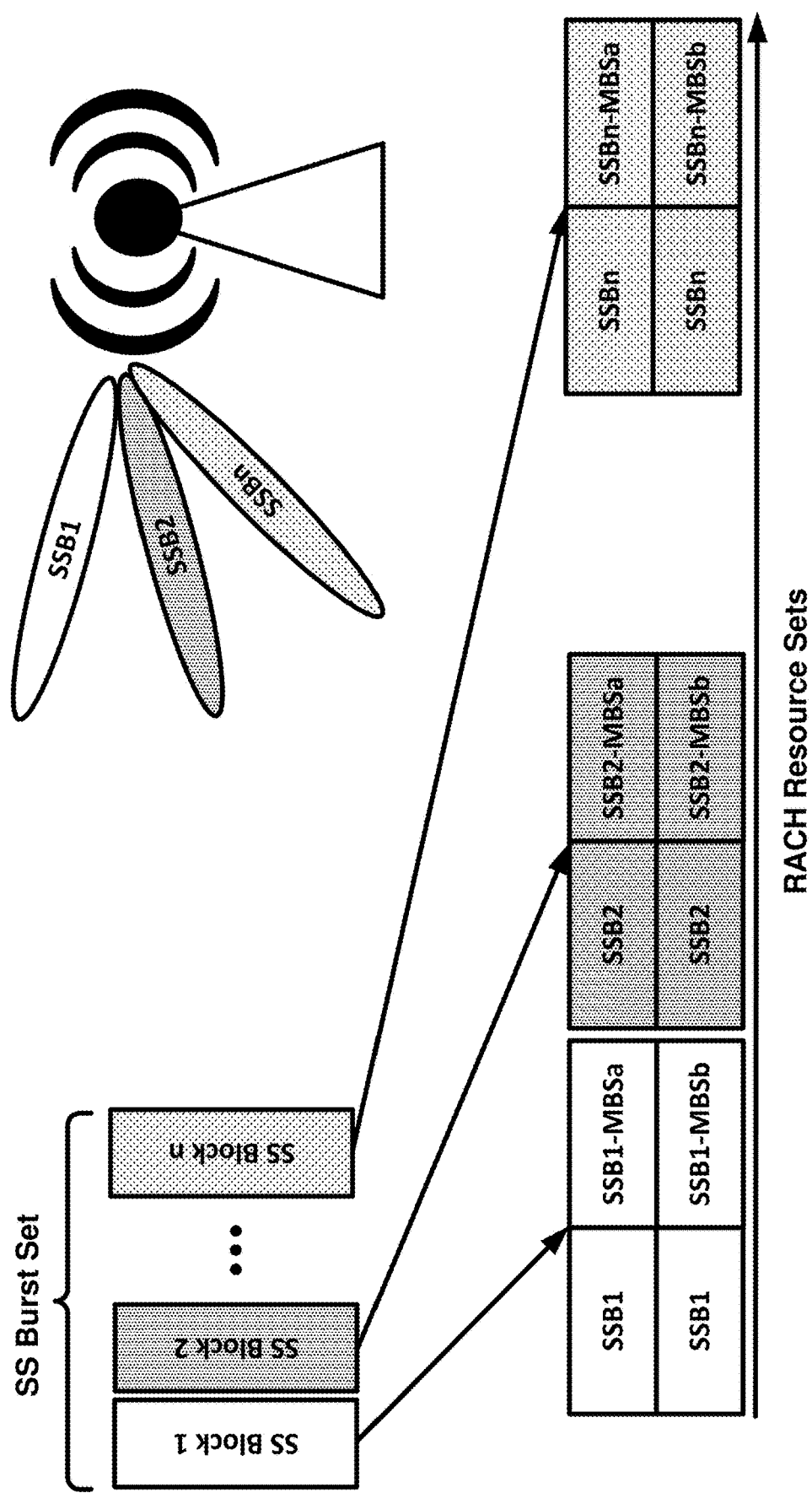
FIG. 19 shows an example process according to some aspects of some of various exemplary embodiments of the present disclosure.

In some examples, the PRACH resources may be configured to sets wherein a set may be associated with a given beam/SSB. This association may be the basis for initial beam correspondence between UE and gNB as shown in FIG. 19.

In some example, RRC configured designated set of PRACHs may be used by RRC idle/inactive UE using for beam-based MBS counting signalling.

Figure 20A:
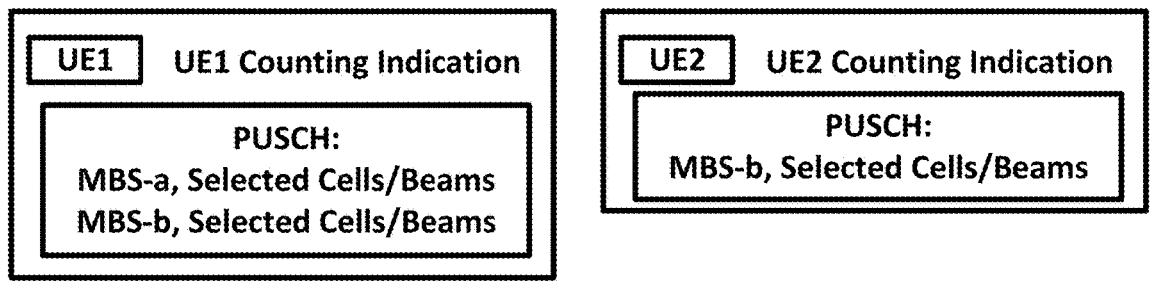
FIG. 20A, FIG. 20B and FIG. 20C show an example process according to some aspects of some of various exemplary embodiments of the present disclosure.

In example embodiments as shown in FIG. 20A, an RRC message such as MBS Interest Indication or another message may be used for indicating or identifying G-RNTIs for MBS services of availability, configuration, or interest and the RRC message may include selected beam information. The message content may point to the beams/cells by including the indexes to Quasi Co-Located (QCL) SSB/CSI-RS resource set on which the UE is receiving the MBS data for each target service, e.g., G-RNTI. In some examples, for a UE in RRC idle or RRC inactive state, the UE may turn into RRC Connected State to send such a message.

Figure 20B:
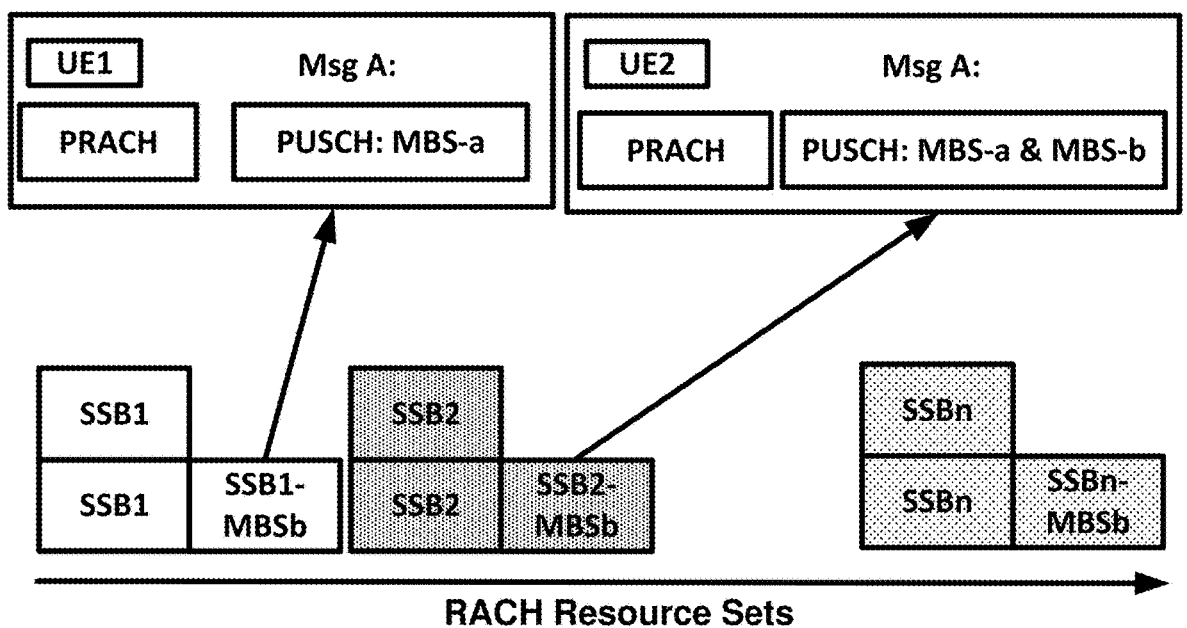

In example embodiments as shown in FIG. 20B, the RRC message for indication of the MBS service(s) of interest may be included in a designated message location, such as a Msg A of a two-step RACH. In another example, a Msg 3 of a four-step RACH. The PRACH resource/preamble used for transmission when associated through RRC configuration with an SSB beam by the gNB may inform RAN about the beam under which the MBS user is located. Such Msg A/Msg 3 transmissions may not be followed by a message B reply or a Msg 4 reply from the gNB (e.g., may be a truncated random access process).

Figure 20C:
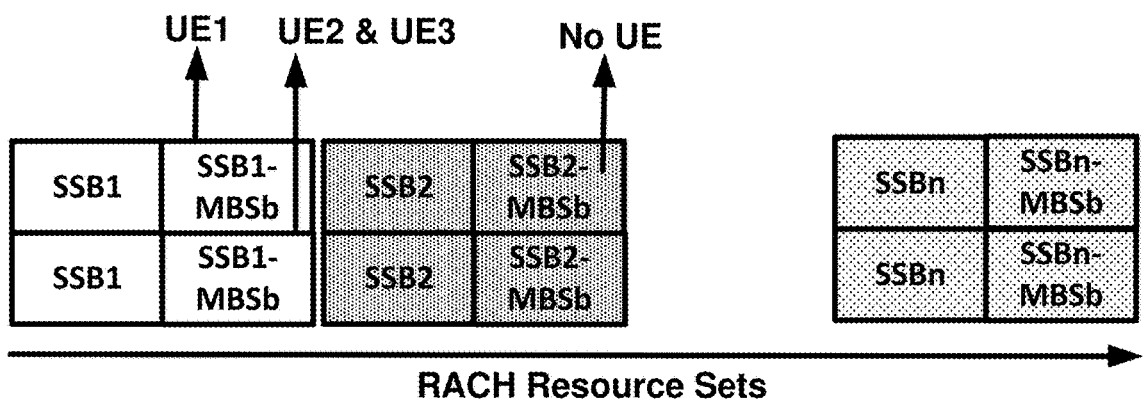

In example embodiments as shown in FIG. 20C, a set of PRACH resource sets/preambles may be configured for each MBS services/G-RNTI for UEs to use to send their interest or reception of that specific MBS service. In this case a simple transmission of PRACH on the selected PRACH resource may identify both the beam and target MBS services without any messages.

In some examples and using with example embodiments discussed above, the base station may need the limited MBS counting/interest feedback from time to time to assess the need for transmission of the MBS data and its PTP/PTM modes over a cell/beam. The exact counting of MBS users may not be needed. To avoid unnecessary and excessive counting signaling their transmissions by UEs may be limited through some randomization in time, e.g., based on UE-ID, and be further gated, e.g., enabled or disabled for each MBS service/G-RNTI by gNB using some RRC or DCI based signaling. In some examples, UE's Counting and Interest Signaling may be limited by RAN, e.g., through some UE-ID based randomization and/or gating controlled for each MBS service/G-RNTI by RRC or DCI signaling.

Figure 21:
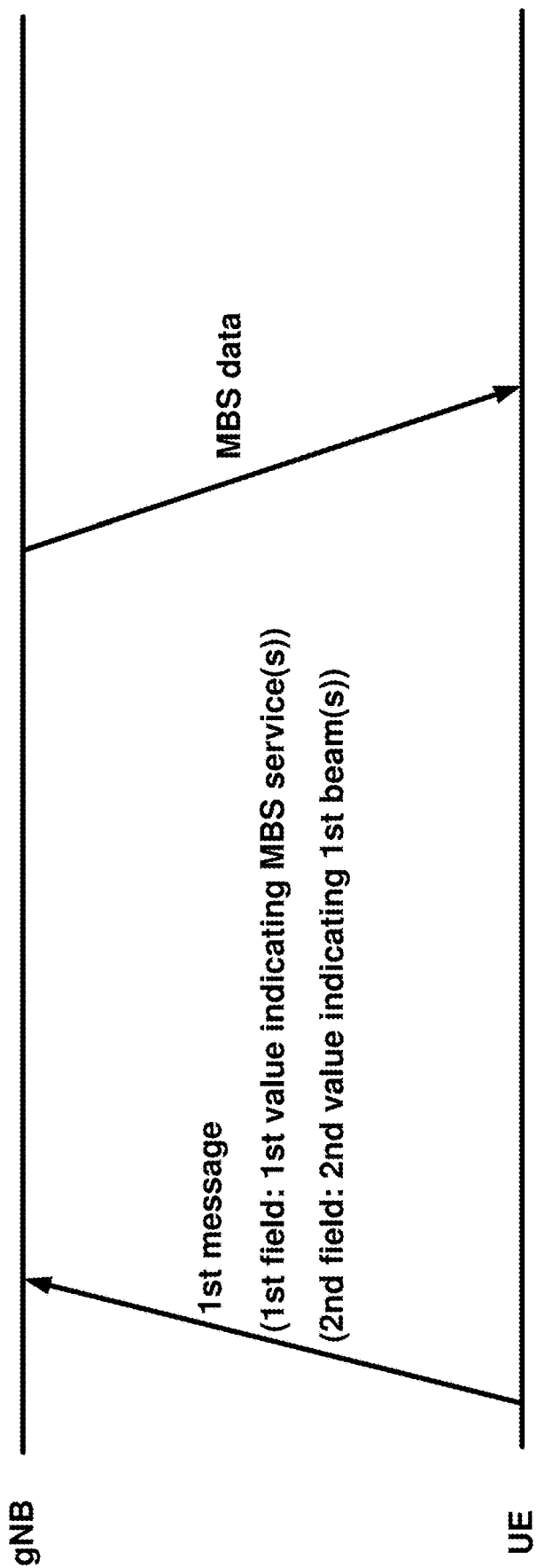
FIG. 21 shows an example process according to some aspects of some of various exemplary embodiments of the present disclosure.

In an example embodiment as shown in FIG. 21, a UE may be interested/configured in receiving at least one MBS service, for example based on higher layers indications (e.g., application layer indications) or may be pre-configured to receive the at least one MBS service or may be (already/currently) receiving the at least one MBS service. The UE may transmit a first message (e.g., an RRC message) indicating that the UE is interested in receiving or is receiving the at least one MBS service and may indicate one or more beams that the UE is receiving or is interested in receiving MBS service (e.g., the at least one MBS service).

In some examples, the UE may transmit the first message in response to receiving a second message (e.g., an MBS counting request message). The MBS counting request message may indicate a plurality of (e.g., a list of) MBS services (e.g., by indicating identifiers of the plurality/list of the MBS services). The plurality/list of the MBS service may comprise the at least one MBS service. In some examples, the UE may transmit the first message based on the plurality/list of the MBS services indicated by the second message (e.g., the MBS counting request message) comprising the at least one MBS service that the UE is receiving or is interested in receiving. The reception of the second message (e.g., the MBS counting request message) and the transmission of the first message may be based on an MBS counting procedure. The MBS counting procedure may be initiated (e.g., by the gNB) to count the UEs that are interested in specific MBS services and/or to count the UEs that are interested in receiving specific MBS services via specific beams.

In some examples, the transmission of the first message may be in response to a trigger at the UE (e.g., may be performed autonomously at the UE and may not be in response to a request from the base station). For example, the trigger may be based on a higher layer indication to the lower layers (e.g., an indication from the application layer to a MAC layer of the UE) or interaction of lower layers to the higher layers.

The first message may comprise a plurality of field comprising a first field and a second field. The first field may have one or more values that correspond to information. The second field may have one or more values that correspond to information. The first value of the first field may include information associated with at least one MBS service, such as an availability or interest in receiving MBS services. In some examples, the first field may comprise/indicate identifiers of the at least one MBS service (e.g., G-RNTIs associated with the at least one MBS service). The second value of the second field may indicate information associated with at least one MBS service via at least one first beam, such as an availability or interest in receiving MBS service via the at least one first beam. In some examples, the second value of the second field may comprise/indicate identifiers (e.g., beam IDs) of the at least one first beam. In some examples, the second value of the second field may indicate quasi-colocation (QCL) reference signals (e.g., CSI-RSs or SSBs) associated with the at least one first beam.

In some examples, the trigger for transmission of the first message (e.g., the trigger at the UE or the reception of the second message (e.g., the counting request message)) may be while the UE is in an RRC state, such as an RRC idle state or an RRC inactive state. The UE may transition from the first state (e.g., an RRC idle state or the RRC inactive state) to a second state (e.g., an RRC connected state) and may transmit the first message after transitioning to the second RRC state. In some examples, the transmission of the first message may be based on a random access process. In some examples, the UE may transition from the RRC idle state or the RRC inactive state to the RRC connected state based on the random access process. In some examples, the random access process may be a truncated random access process (e.g., up to Msg A in a two-step random access process or up to Msg 3 in a four-step random access process). In some examples, the UE may use the truncated random access process for transmission of the first message and may remain in the RRC idle state or the RRC inactive state without transitioning to the RRC connected state.

In response to the transmission of the first message, the UE may receive data of one or more MBS services, comprising the at least one MBS service, via one or more beams comprising the at least one first beam.

In an example embodiment, a UE may be interested in receiving at least one MB S service, for example based on higher layers indications (e.g., application layer indications) or may be pre-configured to receive the at least one MBS service or may be (already/currently) receiving the at least one MBS service. The UE may initiate a random access process (e.g., a two-step random access process or a four-step random access process). In some examples, the UE may initiate the random access process in response to receiving a second message (e.g., an MBS counting request message). The MBS counting request message may indicate a plurality of (e.g., a list of) MBS services (e.g., by indicating identifiers of the plurality/list of the MBS services). The plurality/list of the MBS service may comprise the at least one MBS service.

In some examples, the UE may initiate the random access process based on the plurality/list of the MBS services indicated by the second message (e.g., the MBS counting request message) comprising the at least one MBS service that the UE is receiving or is interested in receiving. The reception of the second message (e.g., the MBS counting request message) and the initiation of the random access process may be based on an MBS counting procedure. The MBS counting procedure may be initiated (e.g., by the gNB) to count the UEs that are interested in specific MBS services and/or to count the UEs that are interested in receiving specific MBS services via specific beams. The indication of the at least one multicast broadcast services (MBS) service and the at least one first beam, by the random access process, may be used by the base station for targeted beam-based multicast broadcast services (MBS) data transmission. In some examples, the initiation of the random access process may be in response to a trigger at the UE (e.g., may be performed autonomously at the UE and may not be in response to a request from the base station). For example, the trigger may be based on a higher layer indication to the lower layers (e.g., an indication from the application layer to a MAC layer of the UE) or interaction of lower layers to the higher layers. In some examples, the UE may transition from a first RRC state (e.g., an RRC idle state or an RRC inactive state) to a second RRC state (e.g., RRC connected state) based on the random access process. In some examples, the UE may use the random access process to transmit a random access preamble or transmit a message via a PUSCH using the random access process and may terminate the random access process (e.g., based on a truncated random access process) and/or may remain in an RRC idle/inactive state while using the random access process for interest indication/counting purposes.

Figure 22:
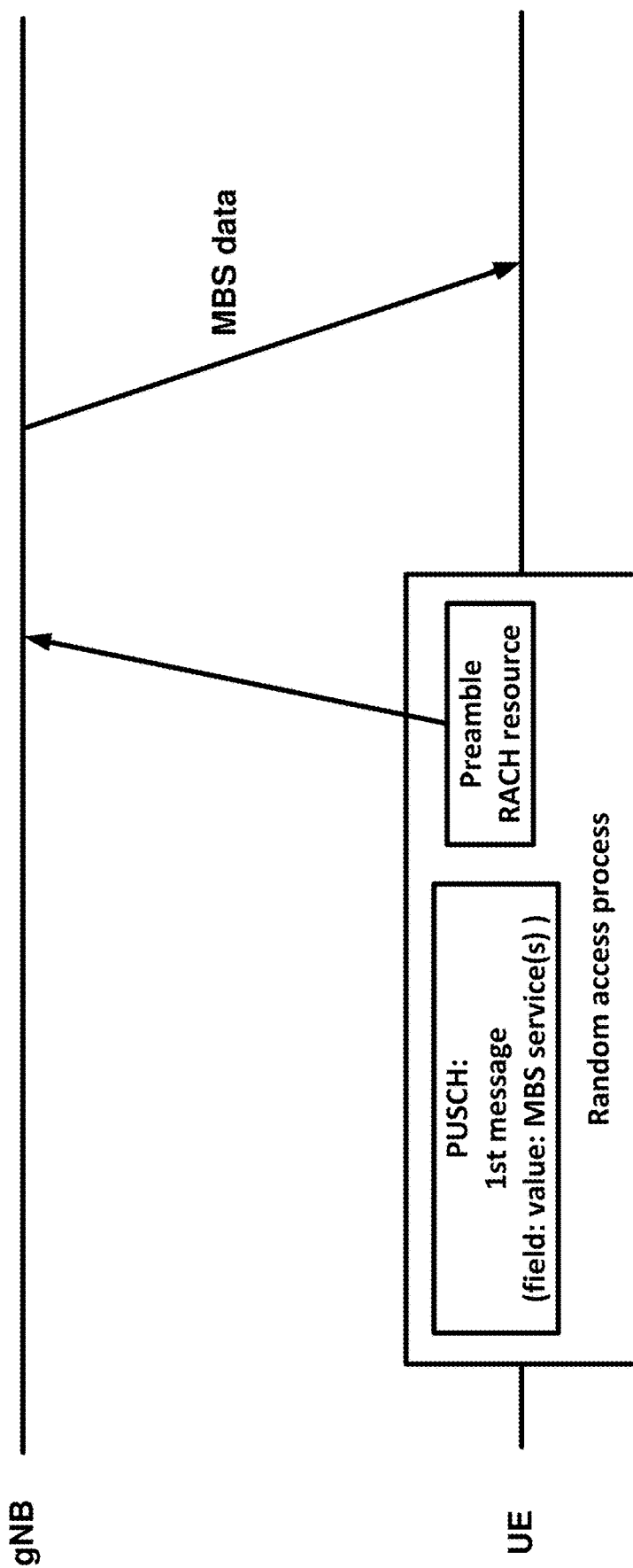
FIG. 22 shows an example process according to some aspects of some of various exemplary embodiments of the present disclosure.

In an example embodiment as shown in FIG. 22, the random access process may comprise transmitting a first message (e.g., as part of Msg A in a two-step random access process or a Msg 3 as part of a four-step random access process). The first message may comprise a field. A value of the field may indicate that the UE is receiving or is interested in receiving data of at least one MBS service. In some examples, the field may comprise/indicate identifiers of the at least one MBS service (e.g., G-RNTIs associated with the at least one MBS service). The random access process may comprise transmitting a random access preamble via a random access resource. At least one of the random access preamble and the random access resource may indicate that the UE is receiving or interested in receiving data of the at least one MBS service via at least one first beam. In some examples, the random access preamble may indicate QCL reference signals (e.g., CSI-RSs or SSBs) associated with the at least one first beam. For example, the UE may be configured with different sets of preambles, each set comprising one or more preambles and each set of preambles being associated with one or more beams. By using the random access preamble, the UE may indicate the one or more first beams based on the association between the sets of random access preambles and beams. In some examples, the random access resource may indicate QCL reference signals (e.g., CSI-RSs or SSBs) associated with the at least one first beam. For example, the UE may be configured with different sets of random access resources, each set comprising one or more random access resources and each set of random access resources being associated with one or more beams. By using the random access resource, the UE may indicate the one or more first beams based on the association between the sets of random access resources and beams. In some examples, the UE may receive configuration parameters indicating mapping/association between the random access resources/random access preambles and the beams configured for the UE.

In response to the initiation of the random access process and transmission of the first message, the UE may receive data of one or more MBS services, comprising the at least one MBS service, via one or more beams comprising the at least one first beam.

In an example embodiment as shown in FIG. 23, the random access process may comprise transmitting a random access preamble via a random access resource. At least one of the random access preamble and the random access resource may indicate that the UE is receiving or interested in receiving data of at least one MBS service and that the UE is receiving or is interested in receiving the data of the at least one MBS service via at least one first beam. In some examples, the random access preamble may indicate QCL reference signals (e.g., CSI-RSs or SSBs) associated with the at least one first beam. For example, the UE may be configured with different sets of preambles, each set comprising one or more preambles and each set of preambles being associated with one or more beams and one or more MBS service. By using the random access preamble, the UE may indicate the at least one first beams and the at least one first MBS service based on the association between the sets of random access preambles and beams/MBS service. In some examples, the random access resource may indicate QCL reference signals (e.g., CSI-RSs or SSBs) associated with the at least one first beam. For example, the UE may be configured with different sets of random access resources, each set comprising one or more random access resources and each set of random access resources being associated with one or more beams/MBS services. By using the random access resource, the UE may identify the one or more first beams based on the association between the sets of random access resources and beams. In some examples, the UE may receive configuration parameters indicating mapping/association between the random access resources/random access preambles and the beams/MBS services configured for the UE. For example, the configuration parameters may indicate a first mapping between the random access preamble/random access resource and the at least one MBS service and a second mapping between the random access preamble/resource and the least one first beam. In some examples, the configuration parameters may indicate a mapping (e.g., joint mapping) between the random access preamble/resource and the at least one MBS service and the at least one first beam.

In response to the initiation of the random access process, the UE may receive data of one or more MBS services, comprising the at least one MBS service, via one or more beams comprising the at least one first beam.

In an embodiment, a user equipment (UE) may transmit to a base station, a first message comprising a first field and a second field, wherein: a first value of the first field indicates that the UE is receiving or is interested in receiving data of at least one MBS service; and a second value of the second field indicates that the UE is receiving or is interested in receiving data of the at least one MBS service via at least one first beam. The UE may receive data of the at least one MBS service via the at least one first beam.

In some embodiments, the transmitting the first message may be in response to receiving a multicast broadcast services (MBS) counting request message from the base station. In some embodiments, the multicast broadcast services (MBS) counting request message may indicate a plurality of MBS services comprising the at least one MBS service. In some embodiments, the transmitting the first message may be based on the user equipment (UE) receiving or being interested in receiving data of one or more multicast broadcast services (MBS) services in the plurality of MBS service indicated by the MBS counting request message. In some embodiments, the first message may be a multicast broadcast services (MBS) counting response message; and the reception of the MBS counting request message and the transmission of the MBS counting response message may be based on an MBS counting procedure. In some embodiments, the multicast broadcast services (MBS) counting procedure may be used by the base station to count the user equipments (UEs) that are interested to receive specific MBS services. In some embodiments, the multicast broadcast services (MBS) counting procedure may be used by the base station to count the user equipments (UEs) that are interested to receive specific MBS services via specific beams.

In some embodiments, the first message may be used by the base station for targeted beam-based multicast broadcast services (MBS) data transmission.

In some embodiments, the transmitting the first message may be in response to a counting indication trigger at the user equipment (UE). In some embodiments, the counting indication trigger may be based on an indication from an application layer of the user equipment (UE).

In some embodiments, the first value of the first field may indicate one or more identifiers of the at least one multicast broadcast services (MBS) service.

In some embodiments, the second value of the second field may indicate quasi colocation (QCL) references signals associated with the at least one first beam. In some embodiments, the quasi colocation (QCL) references signals may comprise at least one of channel state information (CSI)-reference signal (RS) and a synchronization signal block (SSB).

In some embodiments, the UE may transition from a radio resource control (RRC) inactive state or an RRC idle state to an RRC connected state, wherein the transmitting the first message may be after transitioning from the RRC inactive state or the RRC idle state to the RRC connected state.

In some embodiments, the first message may be a radio resource control (RRC) message.

In an embodiment, a user equipment (UE) may initiate a random access process comprising transmitting a first message, to a base station, comprising a field, wherein: a value of the field may indicate that the UE is receiving or is interested in receiving data of at least one MBS service; and the random access process may further comprise transmitting a random access preamble via a random access resource; and at least one of the random access preamble and the random access resource may indicate that the UE is receiving or is interested in receiving data of the at least one MBS service via at least one first beam. The UE may receive data of the at least one MBS service via the at least one first beam.

In some embodiments, the random access process may be a two-step random access process. Transmitting the first message may be via a Msg A message of the two-step random access process.

In some embodiments, the random access process may be a four-step random access process. Transmitting the first message may be via a Msg 3 message of the four-step random access process.

In some embodiments, the initiating the random access process may be in response to receiving a multicast broadcast services (MBS) counting request message from the base station. In some embodiments, the multicast broadcast services (MBS) counting request message may indicate a plurality of MBS services comprising the at least one MBS service. In some embodiments, the initiating the random access process may be based on the user equipment (UE) receiving or being interested in receiving data of one or more multicast broadcast services (MBS) services in the plurality of MBS service indicated by the MBS counting request message. In some embodiments, the first message may be a multicast broadcast services (MBS) counting response message. The reception of the MBS counting request message and the transmission of the MBS counting response message may be based on an MBS counting procedure. In some embodiments, the multicast broadcast services (MBS) counting procedure may be used by the base station to count the user equipments (UEs) that are interested to receive specific MBS services. In some embodiments, the multicast broadcast services (MBS) counting procedure may be used by the base station to count the user equipments (UEs) that are interested to receive specific MBS services via specific beams.

In some embodiments, the first message may be used by the base station for targeted beam-based multicast broadcast services (MBS) data transmission.

In some embodiments, the initiating the random access process may be in response to a counting indication trigger at the user equipment (UE). In some embodiments, the counting indication trigger may be based on an indication from an application layer of the user equipment (UE).

In some embodiments, the value of the field may indicate one or more identifiers of the at least one multicast broadcast services (MBS) service.

In some embodiments, the random access preamble may indicate quasi colocation (QCL) references signals associated with the at least one first beam. In some embodiments, the quasi colocation (QCL) references signals may comprise at least one of channel state information (CSI)-reference signal (RS) and a synchronization signal block (SSB).

In some embodiments, the UE may transition, based on the random access process, from a radio resource control (RRC) inactive state or an RRC idle state to an RRC connected state.

In some embodiments, the first message may be a radio resource control (RRC) message.

In some embodiments, the UE may receive configuration parameters indicating a mapping between the random access preamble and the at least one first beam.

In an embodiment, a UE may initiate a random access process comprising transmitting a random access preamble via a random access resource, wherein at least one of the random access preamble and the random access resource may indicate that the UE is receiving or is interested in receiving data of at least one MBS service via at least one first beam. The UE may receive data of the at least one MBS service via the at least one first beam.

In some embodiments, the UE may receive configuration parameters indicating: a first mapping between the random access preamble and the at least one multicast broadcast services (MBS) service; and a second mapping between the random access preamble and the at least one first beam.

In some embodiments, the UE may receive configuration parameters indicating a mapping between the random access preamble and the at least one multicast broadcast services (MBS) service and the at least one first beam.

In some embodiments, the initiating the random access process may be in response to receiving a multicast broadcast services (MBS) counting request message from the base station. In some embodiments, the multicast broadcast services (MBS) counting request message may indicate a plurality of MBS services comprising the at least one MBS service. In some embodiments, the initiating the random access process may be based on information associated with one or more multicast broadcast services (MBS) services in the plurality of MBS service identified by the MBS counting request message. In some embodiments, the first message may be a multicast broadcast services (MBS) counting response message; and the reception of the MBS counting request message and the transmission of the MBS counting response message may be based on an MBS counting procedure. In some embodiments, the multicast broadcast services (MBS) counting procedure may be used by the base station to count the user equipments (UEs) that are interested to receive specific MBS services. In some embodiments, the multicast broadcast services (MBS) counting procedure may be used by the base station to count the user equipments (UEs) that are interested to receive specific MBS services via specific beams.

In some embodiments, the indication of the at least one multicast broadcast services (MBS) service and the at least one first beam, by the random access preamble, may be used by the base station for targeted beam-based multicast broadcast services (MBS) data transmission.

In some embodiments, the initiating the random access process may be in response to a counting indication trigger at the user equipment (UE).

In some embodiments, the counting indication trigger may be based on an indication from an application layer of the user equipment (UE).

In some embodiments, the random access preamble may indicate quasi colocation (QCL) references signals associated with the at least one first beam. In some embodiments, the quasi colocation (QCL) references signals may comprise at least one of channel state information (CSI)-reference signal (RS) and a synchronization signal block (SSB).

In some embodiments, the UE may transition, based on the random access process, from a radio resource control (RRC) inactive state or an RRC idle state to an RRC connected state.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of multicast broadcast services (MBS) counting indication, comprising:
  transmitting, by a user equipment (UE) to a base station, a first message comprising a first field and a second field, wherein:
  the first field corresponds to information associated with receiving data of at least one MBS service; and
  the second field associated with receiving data of the at least one MBS service via at least one first beam;
  receiving data of the at least one MBS service via the at least one first beam.

Clause 2. The method of Clause 1 further comprising receiving a MBS counting request message from the base station, wherein transmitting the first message includes transmitting the first message responsive to receiving the MBS counting request message.

Clause 3. The method of Clause 2, wherein the MBS counting request message identifies a plurality of MBS services comprising the at least one MBS service.

Clause 4. The method of Clause 2, wherein:
  the first message is a MBS counting response message; and
  the transmission and reception of the MBS counting request message of the MBS counting response message is based on an MBS counting procedure.

Clause 5 The method of Clause 4, wherein the base station utilizes the MBS counting procedure to count one or more UEs associated with receiving data of specific MB S services.

Clause 6. The method of Clause 5, wherein the base station utilizes the MBS counting to count one or more UEs associated with receiving data of specific MBS services via specific beams.

Clause 7. The method of Clause 1, wherein base station uses the first message for targeted beam-based MBS data transmission.

Clause 8. The method of Clause 1, wherein transmitting the first message transmitting the first message in response to a counting indication trigger.

Clause 9. The method of Clause 8, wherein the counting indication trigger is based on an indication from an application layer of the UE.

Clause 10. The method of Clause 1, wherein the first field defines one or more identifiers of the at least one MBS service.

Clause 11. The method of Clause 1, wherein the second field indicates quasi colocation (QCL) references signals associated with the at least one first beam.

Clause 12. The method of Clause 11, wherein the QCL references signals comprise at least one of channel state information (CSI)-reference signal (RS) and a synchronization signal block (SSB).

Clause 13. The method of Clause 1, further comprising transitioning from a first radio resource control (RRC) state to a second RRC state, wherein the first message is transmitted after transitioning from the first RRC state to the second RRC state.

Clause 14. The method of claim 13, wherein first RRC state corresponds to one of an RRC inactive state or an RRC idle state.

Clause 15. The method of Clause 1, wherein the first message is a RRC message.

Clause 16. A method of multicast broadcast services (MBS) counting indication, comprising:
  initiating, by a user equipment (UE), a random access process comprising:
    transmitting a first message, to a base station, the first message including information associated with receiving data of at least one MBS service;
    transmitting a random access preamble via a random access resource, wherein at least one of the random access preamble and the random access includes information associated with receiving data of the at least one MBS service via at least one first beam; and
  receiving data of the at least one MBS service via the at least one first beam.

Clause 17. The method of Clause 16, wherein:
  the random access process is a two-step random access process; and
  transmitting the first message via a designated message of the two-step random access process.

Clause 18. The method of Clause 16, wherein:
  the random access process is a four-step random access process; and
  transmitting the first message via a designated message of the four-step random access process.

Clause 19. The method of Clause 16, wherein initiating the random access process includes initiating the random access process in response to receiving a MBS counting request message from the base station.

Clause 20. The method of Clause 19, wherein the MBS counting request message identifies a plurality of MBS services comprising the at least one MBS service.

Clause 21. The method of Clause 19, wherein:
  the first message is a MBS counting response message; and
  the reception of the MBS counting request message and the transmission of the MBS counting response message is based on an MBS counting procedure.

Clause 22. The method of Clause 21, wherein the base station utilizes the MBS counting procedure to count one or more UEs associated with receiving data of specific MBS services.

Clause 23. The method of Clause 22, wherein the base station utilizes the MBS counting to count one or more UEs associated with receiving data of specific beams.

Clause 24. The method of Clause 16, wherein the base station utilizes the first message for targeted beam-based MBS data transmission.

Clause 25. The method of Clause 16, wherein initiating the random access process includes initiating the random access process in response to a counting indication trigger at the UE.

Clause 26. The method of Clause 25, wherein the counting indication trigger is based on an indication from an application layer of the UE.

Clause 27. The method of Clause 16, wherein the information in the first message indicates one or more identifiers of the at least one MBS service.

Clause 28. The method of Clause 16, wherein the random access preamble indicates QCL reference signals associated with the at least one first beam.

Clause 29. The method of Clause 28, wherein the QCL references signals comprise at least one of channel state information (CSI)-reference signal (RS) and a synchronization signal block (SSB).

Clause 30. The method of Clause 16, further comprising transitioning, by the UE, based on the random access process, from a first RRC state to a second RRC state.

Clause 31. The method of Clause 16, further comprising receiving by the UE, configuration parameters indicating a mapping between the random access preamble and the at least one first beam.

Clause 32. A method of multicast broadcast services (MBS) counting indication comprising
  initiating, by a user equipment (UE), a random access process comprising transmitting a random access preamble via a random access resource, wherein at least one of the random access preamble and the random access resource includes information related to receiving data of at least one MBS service via at least one first beam; and
  receiving data of the at least one MBS service via the at least one first beam.

Clause 33. The method of Clause 32, further comprising receiving by the UE, configuration parameters indicating:
  a first mapping between the random access preamble and the at least one MBS service; and
  a second mapping between the random access preamble and the at least one first beam.

Clause 34. The method of Clause 32, further comprising receiving by the UE, configuration parameters indicating a mapping between the random access preamble and the at least one MBS service and the at least one first beam.

Clause 35. The method of Clause 34, wherein initiating the random access process by the UE, includes receiving the random access process in response to receiving a MBS counting request message from the base station.

Clause 36. The method of Clause 35, wherein the MBS counting request message indicates a plurality of MBS services comprising the at least one MBS service.

Clause 37. The method of Clause 35, wherein:
  the first message is a MBS counting response message; and
  the reception of the MBS counting request message and the transmission of the MBS counting response message is based on an MBS counting procedure.

Clause 38. The method of Clause 37, wherein the base station utilizes the MBX counting procedure to count one or more UEs to receive specific MBS services.

Clause 39. The method of Clause 38, wherein the base station utilizes the MBS counting procedure to count one or more UEs to receive specific MBS services via specific beams.

Clause 40. The method of Clause 32, wherein the base station utilizes the identification of the at least one MBS service and the at least one first beam, by the random access preamble, for targeted beam-based MBS data transmission.

Clause 41. The method of Clause 32, wherein the initiating the random access process includes initiating the random access process in response to a counting indication trigger at the UE.

Clause 42. The method of Clause 41, wherein the counting indication trigger is based on an indication from an application layer of the UE.

Clause 43. The method of Clause 32, wherein the random access preamble indicates QCL references signals associated with the at least one first beam.

Clause 44. The method of Clause 43, wherein the QCL references signals comprise at least one of channel state information (CSI)-reference signal (RS) and a synchronization signal block (SSB).

Clause 45. The method of Clause 32, further comprising transitioning, by the UE, based on the random access process, from a radio resource control (RRC) inactive state or an RRC idle state to an RRC connected state.

Clause 46. An apparatus for utilization in wireless communications comprising:
an antenna for use in transmission of electromagnetic signals;
a memory for maintaining computer-readable code; and
a processor for executing the computer-readable code that causes the apparatus to:
transmit to a base station, a first message comprising a first field and a second field, wherein:
the first field corresponds to information associated with receiving data of at least one MBS service; and
the second field associated with receiving data of the at least one MBS service via at least one first beam;
receive data of the at least one MBS service via the at least one first beam.

Clause 47. The apparatus of Clause 46, wherein the apparatus receives a MBS counting request message from the base station, wherein transmitting the first message includes transmitting the first message responsive to receiving the MBS counting request message.

Clause 48. The apparatus of Clause 47, wherein the MBS counting request message identifies a plurality of MBS services comprising the at least one MBS service.

Clause 49. The apparatus of Clause 47, wherein:
the first message is a MBS counting response message; and
the transmission and reception of the MBS counting request message of the MBS counting response message is based on an MBS counting procedure.

Clause 50. The apparatus of Clause 49, wherein the base station utilizes the MBS counting procedure to count one or more UEs associated with receiving data of specific MBS services.

Clause 51. The apparatus of Clause 50, wherein the base station utilizes the MBS counting to count one or more UEs associated with receiving data of specific MBS services via specific beams.

Clause 52. The apparatus of Clause 46, wherein base station uses the first message for targeted beam-based MBS data transmission.

Clause 53. The apparatus of Clause 46, wherein transmitting the first message transmitting the first message in response to a counting indication trigger.

Clause 54. The apparatus of Clause 53, wherein the counting indication trigger is based on an indication from an application layer of the UE.

Clause 55. The apparatus of Clause 46, wherein the first field defines one or more identifiers of the at least one MBS service.

Clause 56. The apparatus of Clause 46, wherein the second field indicates quasi colocation (QCL) references signals associated with the at least one first beam.

Clause 57. The apparatus of Clause 56, wherein the QCL references signals comprise at least one of channel state information (CSI)-reference signal (RS) and a synchronization signal block (SSB).

Clause 58. The apparatus of Clause 46, wherein the apparatus transitions from a first radio resource control (RRC) state to a second RRC state, wherein the first message is transmitted after transitioning from the first RRC state to the second RRC state.

Clause 59. The apparatus of claim 58, wherein first RRC state corresponds to one of an RRC inactive state or an RRC idle state.

Clause 60. The apparatus of Clause 46, wherein the first message is a RRC message.

Clause 61. An apparatus for utilization in wireless communications comprising:
an antenna for use in transmission of electromagnetic signals;
a memory for maintaining computer-readable code; and
a processor for executing the computer-readable code that causes the apparatus to:
initiate a random access process comprising:
transmitting a first message, to a base station, the first message including information associated with receiving at least one MBS service;
transmitting a random access preamble via a random access resource, wherein at least one of the random access preamble and the random access includes information associated with receiving at least one MBS service via at least one first beam; and
receive data of the at least one MBS service via the at least one first beam.

Clause 62. The apparatus of Clause 61, wherein:
the random access process is a two-step random access process; and
transmitting the first message via a designated message of the two-step random access process.

Clause 63. The apparatus of Clause 61, wherein:
the random access process is a four-step random access process; and
transmitting the first message via a designated message of the four-step random access process.

Clause 64. The apparatus of Clause 61, wherein initiating the random access process includes initiating the random access process in response to receiving a MBS counting request message from the base station.

Clause 65. The apparatus of Clause 64, wherein the MBS counting request message identifies a plurality of MBS services comprising the at least one MBS service.

Clause 66. The apparatus of Clause 61, wherein:
the first message is a MBS counting response message; and
the reception of the MBS counting request message and the transmission of the MBS counting response message is based on an MBS counting procedure.

Clause 67. The apparatus of Clause 66, wherein the base station utilizes the MBS counting procedure to count one or more UEs associated with receiving data of specific MBS services.

Clause 68. The apparatus of Clause 67, wherein the base station utilizes the MBS counting to count one or more UEs associated with receiving data of specific beams.

Clause 69. The apparatus of Clause 61, wherein the base station utilizes the first message for targeted beam-based MBS data transmission.

Clause 70. The apparatus of Clause 61, wherein initiating the random access process includes initiating the random access process in response to a counting indication trigger at the UE.

Clause 71. The apparatus of Clause 70, wherein the counting indication trigger is based on an indication from an application layer of the UE.

Clause 72. The apparatus of Clause 61, wherein the information in the first message indicates one or more identifiers of the at least one MBS service.

Clause 73. The apparatus of Clause 61, wherein the random access preamble indicates QCL reference signals associated with the at least one first beam.

Clause 74. The apparatus of Clause 73, wherein the QCL references signals comprise at least one of channel state information (CSI)-reference signal (RS) and a synchronization signal block (SSB).

Clause 75. The apparatus of Clause 61, wherein the apparatus transitions, based on the random access process, from a first RRC state to a second RRC state.

Clause 76. The apparatus of Clause 61, wherein the apparatus receives configuration parameters indicating a mapping between the random access preamble and the at least one first beam.

Clause 77. An apparatus for utilization in wireless communications comprising:
an antenna for use in transmission of electromagnetic signals;
a memory for maintaining computer-readable code; and
a processor for executing the computer-readable code that causes the apparatus to:
initiate, a random access process comprising transmitting a random access preamble via a random access resource, wherein at least one of the random access preamble and the random access resource includes information related to receiving data of at least one MBS service via at least one first beam; and
receive data of the at least one MBS service via the at least one first beam.

Clause 78. The apparatus of Clause 77, wherein the apparatus receives configuration parameters indicating:
a first mapping between the random access preamble and the at least one MBS service; and
a second mapping between the random access preamble and the at least one first beam.

Clause 79. The apparatus of Clause 77, wherein the apparatus receives configuration parameters indicating a mapping between the random access preamble and the at least one MBS service and the at least one first beam.

Clause 80. The apparatus of Clause 70, wherein initiating the random access process by the UE, includes receiving the random access process in response to receiving a MBS counting request message from the base station.

Clause 81. The apparatus of Clause 80, wherein the MBS counting request message indicates a plurality of MBS services comprising the at least one MBS service.

Clause 82. The apparatus of Clause 80, wherein:
the first message is a MBS counting response message; and
the reception of the MBS counting request message and the transmission of the MBS counting response message is based on an MBS counting procedure.

Clause 83. The apparatus of Clause 82, wherein the base station utilizes the MBX counting procedure to count one or more UEs to receive specific MBS services.

Clause 84. The apparatus of Clause 83, wherein the base station utilizes the MBS counting procedure to count one or more UEs to receive specific MBS services via specific beams.

Clause 85. The apparatus of Clause 77, wherein the base station utilizes the identification of the at least one MBS service and the at least one first beam, by the random access preamble, for targeted beam-based MBS data transmission.

Clause 86. The apparatus of Clause 77, wherein the initiating the random access process includes initiating the random access process in response to a counting indication trigger at the UE.

Clause 87. The apparatus of Clause 86, wherein the counting indication trigger is based on an indication from an application layer of the UE.

Clause 88. The apparatus of Clause 77, wherein the random access preamble indicates QCL references signals associated with the at least one first beam.

Clause 89. The apparatus of Clause 88, wherein the QCL references signals comprise at least one of channel state information (CSI)-reference signal (RS) and a synchronization signal block (SSB).

Clause 90. The apparatus of Clause 77, wherein the apparatus transitions, based on the random access process, from a radio resource control (RRC) inactive state or an RRC idle state to an RRC connected state.

Clause 91. A method of multicast broadcast services (MBS) counting indication, comprising:
receiving, a base station from a user equipment (UE), a first message comprising a first field and a second field, wherein:
the first field corresponds to information associated with receiving data of at least one MBS service; and
the second field associated with receiving data of the at least one MBS service via at least one first beam;
transmitting data of the at least one MBS service via the at least one first beam.

Clause 92. The method of Clause 91 further comprising transmitting a MBS counting request message from the base station, wherein receiving the first message includes transmitting the first message responsive to receiving the MBS counting request message.

Clause 93. The method of Clause 92, wherein the MBS counting request message identifies a plurality of MBS services comprising the at least one MBS service.

Clause 94. The method of Clause 90, wherein:
the first message is a MBS counting response message; and
the transmission and reception of the MBS counting request message of the MBS counting response message is based on an MBS counting procedure.

Clause 95. The method of Clause 94 further comprising utilizing the MBS counting procedure to count one or more UEs associated with receiving data of specific MBS services.

Clause 96. The method of Clause 95, wherein utilizing the MBS counting procedure includes utilizing the counting procedure to count one or more UEs associated with receiving data of specific MBS services via specific beams.

Clause 97. The method of Clause 91 further comprising utilizing the first message for targeted beam-based MBS data transmission.

Clause 98. The method of Clause 91, wherein receiving the first message transmitting the first message in response to a counting indication trigger.

Clause 99. The method of Clause 98, wherein the counting indication trigger is based on an indication from an application layer of the UE.

Clause 100. The method of Clause 91, wherein the first field defines one or more identifiers of the at least one MBS service.

Clause 101. The method of Clause 91, wherein the second field indicates quasi colocation (QCL) references signals associated with the at least one first beam.

Clause 102. The method of Clause 101, wherein the QCL references signals comprise at least one of channel state information (CSI)-reference signal (RS) and a synchronization signal block (SSB).

Clause 103. The method of Clause 46, wherein the UE transitions from a first radio resource control (RRC) state to a second RRC state, wherein the first message is transmitted after transitioning from the first RRC state to the second RRC state.

Clause 104. The method of claim 103, wherein first RRC state corresponds to one of an RRC inactive state or an RRC idle state.

Clause 105. The method of Clause 91, wherein the first message is a RRC message.

Clause 106. A method of multicast broadcast services (MBS) counting indication, comprising:
  receiving, by a user equipment (UE), a random access process comprising:
  receiving a first message, to a base station, the first message including information associated with receiving data of at least one MBS service;
  receiving a random access preamble via a random access resource, wherein at least one of the random access preamble and the random access includes information associated with receiving data of the at least one MBS service via at least one first beam; and
  transmitting data of the at least one MBS service via the at least one first beam.

Clause 107. The method of Clause 106, wherein:
  the random access process is a two-step random access process; and
  receiving the first message via a designated message of the two-step random access process.

Clause 108. The method of Clause 106, wherein:
  the random access process is a four-step random access process; and
  transmitting the first message via a designated message of the four-step random access process.

Clause 109. The method of Clause 106, wherein receiving the random access process includes receiving the random access process in response to transmitting a MBS counting request message.

Clause 110. The method of Clause 109, wherein the MBS counting request message identifies a plurality of MBS services comprising the at least one MBS service.

Clause 111. The method of Clause 109, wherein:
  the first message is a MBS counting response message; and
  the reception of the MBS counting request message and the transmission of the MBS counting response message is based on an MBS counting procedure.

Clause 112. The method of Clause 111, wherein the base station utilizes the MBS counting procedure to count one or more UEs associated with receiving data of specific MBS services.

Clause 113. The method of Clause 112, wherein the base station utilizes the MBS counting to count one or more UEs associated with receiving data of specific beams.

Clause 114. The method of Clause 106 further comprising utilizing the first message for targeted beam-based MBS data transmission.

Clause 115. The method of Clause 106, wherein receiving the random access process includes initiating the random access process in response to a counting indication trigger at the UE.

Clause 116. The method of Clause 115, wherein the counting indication trigger is based on an indication from an application layer of the UE.

Clause 117. The method of Clause 106, wherein the information in the first message indicates one or more identifiers of the at least one MBS service.

Clause 118. The method of Clause 106, wherein the random access preamble indicates QCL reference signals associated with the at least one first beam.

Clause 119. The method of Clause 118, wherein the QCL references signals comprise at least one of channel state information (CSI)-reference signal (RS) and a synchronization signal block (SSB).

Clause 120. The method of Clause 106, wherein the UE transitions, based on the random access process, from a first RRC state to a second RRC state.

Clause 121. The method of Clause 106, further comprising transmitting configuration parameters indicating a mapping between the random access preamble and the at least one first beam.

Clause 122. A method of multicast broadcast services (MBS) counting indication comprising
  receiving, by a base station, a random access process comprising transmitting a random access preamble via a random access resource, wherein at least one of the random access preamble and the random access resource includes information related to receiving data of at least one MBS service via at least one first beam; and
  transmitting, by the base station, data of the at least one MBS service via the at least one first beam.

Clause 123. The method of Clause 122, further comprising transmitting, by the base station, configuration parameters indicating:
  a first mapping between the random access preamble and the at least one MBS service; and
  a second mapping between the random access preamble and the at least one first beam.

Clause 124. The method of Clause 122, further comprising transmitting, by the base station, configuration parameters indicating a mapping between the random access preamble and the at least one MBS service and the at least one first beam.

Clause 125. The method of Clause 124, wherein transmitting the random access process by the UE, includes transmitting the random access process in response to transmitting a MBS counting request message.

Clause 126. The method of Clause 122, wherein the MBS counting request message indicates a plurality of MBS services comprising the at least one MBS service.

Clause 127. The method of Clause 122, wherein:
  the first message is a MBS counting response message; and
  the reception of the MBS counting request message and the transmission of the MBS counting response message is based on an MBS counting procedure.

Clause 128. The method of Clause 82 further comprising utilizing the MBX counting procedure to count one or more UEs to receive specific MBS services.

Clause 129 The method of Clause 128, wherein utilizing the MBS counting procedure includes utilizing the MBS counting procedure to count one or more UEs to receive specific MBS services via specific beams.

Clause 130. The method of Clause 122, wherein utilizing the identification of the at least one MBS service and the at least one first beam, by the random access preamble, for targeted beam-based MBS data transmission.

Clause 131. The method of Clause 122, wherein the receiving the random access process includes initiating the random access process in response to a counting indication trigger at the UE.

Clause 132. The method of Clause 131, wherein the counting indication trigger is based on an indication from an application layer of the UE.

Clause 133. The method of Clause 122, wherein the random access preamble indicates QCL references signals associated with the at least one first beam.

Clause 134. The method of Clause 133, wherein the QCL references signals comprise at least one of channel state information (CSI)-reference signal (RS) and a synchronization signal block (SSB).

Clause 135. The method of Clause 122, wherein the UE transitions, based on the random access process, from a radio resource control (RRC) inactive state or an RRC idle state to an RRC connected state.

The invention claimed is:

1. A method of multicast broadcast services (MBS) counting indication, comprising:
   transmitting, by a user equipment (UE) to a base station, a first message comprising a first field corresponding to information associated with receiving data of at least one MBS service; and
   receiving the data of the at least one MBS service via at least one first beam,
   wherein transmitting the first message includes transmitting the first message in response to a counting indication trigger, and
   the counting indication trigger is based on an indication from an application layer of the UE.

2. The method of claim 1 further comprising receiving an MBS counting request message from the base station, wherein transmitting the first message comprises transmitting the first message responsive to receiving the MBS counting request message.

3. The method of claim 2, wherein the MBS counting request message identifies a plurality of MBS services comprising the at least one MBS service.

4. The method of claim 2, wherein:
   the first message is an MBS counting response message; and
   receiving the MBS counting request message and transmitting the MBS counting response message are based on an MBS counting procedure.

5. The method of claim 4, wherein the base station utilizes the MBS counting procedure to count one or more UEs associated with receiving data of specific MBS services.

6. The method of claim 5, wherein the base station utilizes the MBS counting procedure to count one or more UEs associated with receiving the data of the specific MBS services via one or more specific beams.

7. The method of claim 1, wherein the base station uses the first message for targeted beam-based MBS data transmission.

8. The method of claim 1, wherein the first message further comprises a second field associated with receiving the data of the at least one MBS service via the at least one first beam.

9. The method of claim 1, wherein the first field defines one or more identifiers of the at least one MBS service.

10. The method of claim 8, wherein the second field indicates one or more quasi colocation (QCL) reference signals associated with the at least one first beam.

11. The method of claim 10, wherein the one or more QCL reference signals comprise at least one of channel state information (CSI)-reference signal (RS) or a synchronization signal block (SSB).

12. The method of claim 1, further comprising transitioning from a first radio resource control (RRC) state to a second RRC state, wherein the first message is transmitted after transitioning from the first RRC state to the second RRC state.

13. The method of claim 12, wherein the first RRC state corresponds to one of an RRC inactive state or an RRC idle state.

14. The method of claim 1, wherein the first message is an RRC message.

15. A method of multicast broadcast services (MBS) counting indication, comprising:
   initiating, by a user equipment (UE), a random access process, wherein initiating the random access process comprises:
      transmitting, to a base station, a first message, the first message including information associated with receiving data of at least one MBS service; and
      transmitting a random access preamble via a random access resource, wherein at least one of the random access preamble or the random access resource includes information associated with receiving the data of the at least one MBS service via at least one first beam; and
   receiving the data of the at least one MBS service via the at least one first beam.

16. The method of claim 15, wherein:
   the random access process is a two-step random access process; and
   transmitting the first message further comprises transmitting the first message via a Msg-A of the two-step random access process.

17. The method of claim 15, wherein:
   the random access process is a four-step random access process; and
   transmitting the first message further comprises transmitting the first message via a Msg 3 of the four-step random access process.

18. The method of claim 15, wherein initiating the random access process includes initiating the random access process in response to receiving a MBS counting request message from the base station.

19. The method of claim 18, wherein the MBS counting request message identifies a plurality of MBS services including the at least one MBS service.

20. The method of claim 18, wherein:
   the first message is an MBS counting response message; and
   receiving the MBS counting request message and transmitting the MBS counting response message are based on an MBS counting procedure.

21. The method of claim 20, wherein the base station utilizes the MBS counting procedure to count one or more UEs associated with receiving data of specific MBS services.

22. The method of claim 21, wherein the base station utilizes the MBS counting procedure to count one or more UEs associated with receiving the data of the specific MBS services via one or more specific beams.

23. The method of claim 15, wherein the base station utilizes the first message for targeted beam-based MBS data transmission.

24. The method of claim 15, wherein initiating the random access process includes initiating the random access process in response to a counting indication trigger at the UE.

25. The method of claim 24, wherein the counting indication trigger is based on an indication from an application layer of the UE.

26. The method of claim 15, wherein the information in the first message indicates one or more identifiers of the at least one MBS service.

27. The method of claim 15, wherein the random access preamble indicates one or more QCL reference signals associated with the at least one first beam.

28. The method of claim 27, wherein the one or more QCL reference signals comprise at least one of channel state information (CSI)-reference signal (RS) or a synchronization signal block (SSB).

29. The method of claim 15, further comprising transitioning, by the UE, based on the random access process, from a first radio resource control (RRC) state to a second RRC state.

30. The method of claim 15, further comprising receiving by the UE, one or more configuration parameters indicating a mapping between the random access preamble and the at least one first beam.

31. A method of multicast broadcast services (MBS) counting indication comprising:
    initiating, by a user equipment (UE), a random access process comprising transmitting a random access preamble via a random access resource, wherein at least one of the random access preamble or the random access resource includes information related to receiving data of at least one MBS service via at least one first beam;
    receiving the data of the at least one MBS service via the at least one first beam; and
    receiving one or more configuration parameters indicating at least one of:
        a first mapping between the random access preamble and the at least one MBS service; or
        a second mapping between the random access preamble and the at least one first beam.

32. The method of claim 31, further comprising receiving by the UE, one or more configuration parameters indicating a mapping between the random access preamble and the at least one MBS service and the at least one first beam.

33. The method of claim 32, wherein initiating the random access process comprises initiating the random access process in response to receiving an MBS counting request message from the base station.

34. The method of claim 33, wherein the MBS counting request message indicates a plurality of MBS services including the at least one MBS service.

35. The method of claim 33, wherein:
    the first message is an MBS counting response message; and
    receiving the MBS counting request message and transmitting the MBS counting response message are based on an MBS counting procedure.

36. The method of claim 35, wherein the base station utilizes the MBS counting procedure to count one or more UEs to receive specific MBS services.

37. The method of claim 36, wherein the base station utilizes the MBS counting procedure to count one or more UEs to receive the specific MBS services via one or more specific beams.

38. The method of claim 31, wherein the base station utilizes identification of the at least one MBS service and the at least one first beam for targeted beam-based MBS data transmission.

39. The method of claim 31, wherein the initiating the random access process includes initiating the random access process in response to a counting indication trigger at the UE.

40. The method of claim 39, wherein the counting indication trigger is based on an indication from an application layer of the UE.

41. The method of claim 31, wherein the random access preamble indicates one or more QCL reference signals associated with the at least one first beam.

42. The method of claim 41, wherein the one or more QCL reference signals comprise at least one of channel state information (CSI)-reference signal (RS) or a synchronization signal block (SSB).

43. The method of claim 31, further comprising transitioning, by the UE, based on the random access process, from a radio resource control (RRC) inactive state or an RRC idle state, to an RRC connected state.

44. A method of multicast broadcast services (MBS) counting indication, comprising:
    receiving, by a base station from a user equipment (UE), a first message comprising a first field corresponding to information associated with receiving data of at least one MBS service; and
    transmitting the data of the at least one MBS service via at least one first beam,
    wherein receiving the first message includes receiving the first message in response to a counting indication trigger, and
    the counting indication trigger is based on an indication from an application layer of the UE.

\* \* \* \* \*